(12) United States Patent
Helle et al.

(10) Patent No.: US 11,785,229 B2
(45) Date of Patent: *Oct. 10, 2023

(54) PICTURE CODING SUPPORTING BLOCK PARTITIONING AND BLOCK MERGING

(71) Applicant: GE VIDEO COMPRESSION, LLC, Albany, NY (US)

(72) Inventors: Philipp Helle, Berlin (DE); Heiko Schwarz, Panketal (DE); Detlev Marpe, Berlin (DE); Thomas Wiegand, Berlin (DE); Simon Oudin, Berlin (DE); Benjamin Bross, Berlin (DE)

(73) Assignee: GE Video Compression, LLC, Niskayuna, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/330,197

(22) Filed: May 25, 2021

(65) Prior Publication Data

US 2021/0281861 A1 Sep. 9, 2021

Related U.S. Application Data

(63) Continuation of application No. 17/038,777, filed on Sep. 30, 2020, now Pat. No. 11,057,630, which is a (Continued)

(51) Int. Cl.
*H04N 19/176* (2014.01)
*H04N 19/119* (2014.01)
(Continued)

(52) U.S. Cl.
CPC ......... *H04N 19/176* (2014.11); *H04N 19/119* (2014.11); *H04N 19/147* (2014.11);
(Continued)

(58) Field of Classification Search
CPC .. H04N 19/176; H04N 19/119; H04N 19/147; H04N 19/196; H04N 19/46
(Continued)

(56) References Cited

U.S. PATENT DOCUMENTS

| 5,225,904 A | 7/1993 | Golin et al. |
| 7,529,302 B2 | 5/2009 | Mukerjee et al. |

(Continued)

FOREIGN PATENT DOCUMENTS

| CN | 1756363 A | 4/2006 |
| CN | 1801946 A | 7/2006 |

(Continued)

OTHER PUBLICATIONS

Office Action issued in corresponding Japanese Patent Application 2020-156724 dated Aug. 2, 2022, with English translation.
(Continued)

*Primary Examiner* — Jeffery A Williams
*Assistant Examiner* — Kristin Dobbs
(74) *Attorney, Agent, or Firm* — Morgan, Lewis & Bockius LLP

(57) ABSTRACT

A further coding efficiency increase may be achieved if for a current block of a picture, for which the bit stream signals one of supported partitioning patterns, a reversal of the partitioning by block merging is avoided. In particular, if the signaled one of the supported partitioning patterns specifies a subdivision of the block into two or more further blocks, a removal of certain coding parameter candidates for all further blocks, except a first further block of the further blocks in a coding order, is performed. Particularly, those coding parameter candidates are removed from the set of coding parameter candidates for the respective further block, the coding parameters of which are the same as coding parameters associated with any of the further blocks which,
(Continued)

when being merged with the respective further block, would result in one of the supported partitioning pattern. This avoids redundancy between partitioning coding and merging coding.

20 Claims, 9 Drawing Sheets

Related U.S. Application Data continuation of application No. 16/846,579, filed on Apr. 13, 2020, now Pat. No. 10,827,187, which is a continuation of application No. 13/857,506, filed on Apr. 5, 2013, now Pat. No. 10,735,748, which is a continuation of application No. PCT/EP2011/067647, filed on Oct. 10, 2011.

(60) Provisional application No. 61/391,473, filed on Oct. 8, 2010.

(51) Int. Cl.
    *H04N 19/61*     (2014.01)
    *H04N 19/196*     (2014.01)
    *H04N 19/46*     (2014.01)
    *H04N 19/147*     (2014.01)
    *H04N 19/93*     (2014.01)
    *H04N 19/70*     (2014.01)

(52) U.S. Cl.
CPC ........... *H04N 19/196* (2014.11); *H04N 19/46* (2014.11); *H04N 19/61* (2014.11); *H04N 19/70* (2014.11); *H04N 19/93* (2014.11)

(58) Field of Classification Search
USPC .................................................. 375/240.24
See application file for complete search history.

(56) References Cited

U.S. PATENT DOCUMENTS

| | | | |
|---|---|---|---|
| 7,606,311 | B2 | 10/2009 | Hsu et al. |
| 7,899,119 | B2 | 3/2011 | Thoreau et al. |
| 2008/0165855 | A1 | 7/2008 | Wang et al. |
| 2009/0080798 | A1 | 3/2009 | Maurer et al. |
| 2009/0154546 | A1 | 6/2009 | Liu |
| 2013/0148737 | A1 | 6/2013 | Tourapis et al. |
| 2020/0128259 | A1 | 4/2020 | Helle et al. |

FOREIGN PATENT DOCUMENTS

| | | | |
|---|---|---|---|
| CN | 1874509 | A | 12/2006 |
| CN | 1998152 | A | 7/2007 |
| CN | 101017573 | A | 8/2007 |
| CN | 101222635 | A | 7/2008 |
| CN | 101223780 | A | 7/2008 |
| CN | 101282478 | A | 10/2008 |
| CN | 101375608 | A | 2/2009 |
| CN | 101409831 | A | 4/2009 |
| CN | 101223780 | A | 7/2009 |
| CN | 101682769 | A | 3/2010 |
| CN | 101765010 | A | 6/2010 |
| JP | 2004-040785 | A | 2/2004 |
| JP | 2004040785 | A | 2/2004 |
| JP | 2010524397 | A | 7/2010 |
| JP | 2015200777 | A | 2/2016 |
| JP | 2018082466 | A | 5/2018 |
| WO | 2004/080084 | A1 | 9/2004 |
| WO | 2006058921 | A | 6/2006 |
| WO | 2006058921 | A1 | 6/2006 |
| WO | 2008127597 | A2 | 10/2008 |
| WO | 2009/091383 | A2 | 7/2009 |
| WO | 2009091383 | A2 | 7/2009 |

OTHER PUBLICATIONS

Notification of Reasons for Refusal issued in corresponding Japanese Patent Application No. 2020-046738 dated Apr. 6, 2021, with English translation.
Extended European Search Report issued in corresponding European Patent Application No. 20201843.8 dated Apr. 26, 2021.
Appeal Decision issued in corresponding Japanese Patent Application No. 2015-200777 dated Nov. 10, 2020.
Office Action issued in corresponding Brazilian Patent Application No. BR112013008461-8 dated Nov. 24, 2020.
Bin Li et al., "Redundancy reduction in Cbf and Merge coding", Joint Collaborative Team on Video Coding (JCT/VC) ot ITU-T SG16 WP3 and ISO/IEC JTC1/SC29/WG11, 3rd Meeting: Guangzhou, CN, Oct. 7-15, 2010.
Anonymous, "Test Model under Consideration", Joint Collaborative Team on Video Coding (JCT/VC) of ITU-T SG16 WP3 and ISO/IEC JTC1/SC29/WG11, 2nd Meeting: Geneva, CH, Jul. 21-28, 2010.
Rafaele De Forni et al., "On the Benefits of Leaf Merging in Quad-Tree Motion Models", Image Processing, 2003, ICIP 2005, vol. 2, DOI:10.1109/ICIP.2005.1530191, ISBN 978-0-7803-9134-5, pp. 858-861.
Benjamin Bross et al., "WD4: Working Draft 4 of High-Efficiency Video Coding", Joint Collaborative Team on Video Coding (JCT/VC) of ITU-T SG16 WP3 and ISO/IEC JTC1/SC29/WG11, 6th Meeting: Torino, IT, Jul. 14-22, 2011.
Office Action issued in corresponding Indian Patent Application No. 201938001536 dated Jan. 8, 2021.
Notice of Allowance issued in corresponding Taiwanese Patent Application No. 108129640 dated Jan. 20, 2021, with English translation.
Feng Lu et al., "Bit-Depth Scalable Coding Using a Perfect Picture and Adaptive Neighboring Filter", Tsinghua Science and Technology, ISSN 1007-0214, 04/18, vol. 14, No. 5, Oct. 2009, pp. 570-574.
Shuo Yao et al., "A Hardward Implementation for Full-search Motion Estimation of AVS with Search Center Prediction", IEEE Transaction on Consumer Electronics, vol. 52, No. 4, Nov. 2006, pp. 1356-1361.
Official Communication issued in International Patent Application No. PCT/EP2011/067647, dated Nov. 14, 2011.
Li et al., "Redundancy Reduction in CBF and Merge Coding," Joint Collaborative Team on Video Coding (JCT-VC) of ITU-T SG16 WP3 and ISO/IEC JTC1/SC29/WG11, Oct. 7-15, 2010, 8 pages.
Test Model Under Consideration, Joint Collaborative Team on Video Coding (JCT-VC) of ITU-T SG16 WP3 and ISO/ IEC JTC1/SC29/WG11, Jul. 21-28, 2010, 152 pages.
"On the Benefits of Leaf Merging in Quad-Tree Motion Models", International Conference on Image Processing, 2005. ICIP 2005, vol. 2, Sep. 11, 2005, pp. 858-861, XP010851189 4 pages.
Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, Mar. 16-23, 2011, 160 pages.
Lim, "Extended Merging Scheme Using Motion-Hypothesis Inter Prediction," Joint Collaborative Team on Video Coding (JCT-VC) of ITU-T SG16 WP3 and ISO/IEC JTC1/SC29/WG11, Jul. 21-28, 2010, pp. 1-7.
Office Action dated Oct. 22, 2015 in the parallel Taiwanese patent application No. 103146089, with English translation, 19 pages.
Non-final Office Action U.S. Appl. No. 13/857,506 dated Mar. 25, 2016.
Office Action dated Mar. 3, 2016, in the parallel Chinese patent application No. 201180059042, with English translation, 13 pages.
Final Office Action U.S. Appl. No. 13/857,506 dated Dec. 1, 2016.
Office Action dated Jan. 31, 2017 in Japanese Application 2015-200777.
Chen et al. MVP index parsing with fixed number of candidates, Joint Collaborative Team on Video Coding (JCT-VG) of ITU-T SG16 WP3 and ISO/IEC JTC/SC29/WG11 JTC1/SC29/WG11 6th Meeting: Torino, IT, Jul. 14-22, 2011, Jul. 12, 2011, JCTVC-F402_rl.

(56) References Cited

OTHER PUBLICATIONS

Non-final Office Action U.S. Appl. No. 13/857,506 dated Sep. 22, 2017.
T. Sugio et al., Parsing Robustness for Merge/AMVP, Joint Collaborative Team on Video Coding JCT-VC of ITU-T SG16 WP3 and ISO/IEC JTC1/SC29/WG11 6th Meeting: Torino, IT, Jul. 14-22, 2011, Jul. 14, 2011 JCTVC-F470.
Final Office Action U.S. Appl. No. 13/857,506 dated May 24, 2018.
Non-final Office Action U.S. Appl. No. 13/857,506 dated Oct. 19, 2018.
Notice of Decision for Patent Korean Patent Application No. 10-2017-7029761 dated Nov. 20, 2018 with English translation.
Raffaele De Forni et al., "On the Benefits of Leaf Merging in Quad-Tree Motion Models", University of Padova, Italy, University of New South Wales, Sydney, Australia, IEEE, ICIP-2005, Sep. 11, 2005, 4 pgs.
Bin Li et al., "Redundancy reduction in Cbf and Merge coding", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document JCTVC-C277, pp. 1-8.
Office Action Taiwanese Patent Application No. 106145760 dated Nov. 30, 2018 with English translation.
Notification of the First Office Action Chinese Patent Application No. 2016112172493 dated Feb. 3, 2019.
Bin Li—Redundancy reduction in Cbf and Merge coding, (Joint Collaborative Team on Video Coding (JCT-VC), Document:JCTVC-C277)).
Notification of the First Office Action Chinese Patent Application No. 201611217282.6 dated Feb. 2, 2019.
Notification of Reasons for Refusal Japanese Patent Application No. 2018-000339 dated Jan. 29, 2019.
Benjamin BROSS et al., WD4: Working Draft 4 of High Efficiency Video Coding, Joint Collaborative Team on Video Coding (JCT-VC) 6th Meeting: Torino, JCTVC-F803-v3.zip, Sep. 8, 2011, JCTVC-F803_d1.doc.
Notice of Reasons for Refusal dated Mar. 26, 2019 issued in corresponding JP Office Action 2015-200777.
Toshiyasu Sugio, Joint Callaborative Team on Video Coding (JCT-VC) of Itu-t SG16 WP3 and ISO/IEC JTOC1/SC29/WG11 6th Meeting: Torino, IT, Jul. 14-22, 2011, JCTVC-F470.
First Office Action Chinese Patent Application No. 201611216865.7 dated May 29, 2019.
Notification of the First Office Action Chinese Patent Application No. 2016112178485 dated Jun. 5, 2019.
Notification of the First Office Action Chinese Patent Application No. 201611216843.0 dated Jun. 26, 2019.
Notice of Allowance dated Jul. 18, 2019 in Taiwanese Application 106145760.
Notice of Allowance dated Aug. 2, 2019 in Korean Application 10-2018-7024592.
Office Action dated Aug. 5, 2019 in Chinese Application 201611216859.1.
Office Action dated Sep. 17, 2019 in Japanese Application 2018-000339.
Notice of Allowance dated Oct. 22, 2019 in Chinese Application 2016112172826.
Notice of Allowance dated Jan. 14, 2020 in Korean Application 10-2019-7004924.
Notice of Allowance dated Feb. 25, 2020 in U.S. Appl. No. 13/857,506.
Notice of Issuance dated Mar. 6, 2020 in Chinese Application 201611216843.0.
Office Action dated Mar. 16, 2020 in Chinese Application 201611216865.7.
Office Action dated Mar. 25, 2020 in Chinese Application 201611216859.1.
Office Action dated Mar. 25, 2020 in Chinese Application 201611217848.5.
Office Action dated Mar. 17, 2020 in Japanese Application 2015-200777.
Office Action dated May 25, 2020 in European Application 20155688.3.
Martin Winken et al: "Video coding technology proposal by Fraunhofer HHI", 1. JCT-VC Meeting; Apr. 15-23, 2010; Dresden; (Joint Collaborative Team on Video Coding of ISO/IEC JTC1/SC29/WG11 and ITU-TSG. 16); URL: http://WFTP3.ITU.INT/AV-ARCH/JCTVC-SITE/, No. JCTVC-A116, Apr. 24, 2010, XP030007557.
Office Action dated May 29, 2020 in Chinese Application 201611217848.5.
Notice of Issuance dated May 29, 2020 in Chinese Application 201611216859.1.
Decision to Grant dated Jun. 1, 2020 in Japanese Application 2018-000339.
Benjamin Bross et al., WD4: Working Draft 4 of High-Efficiency Video Coding, Aug. 9, 2011, [JGTVC-F803_d0].
Notice of Issuance dated May 29, 2020 in Chinese Application 201611216865.7.
Notice of Allowance dated Jun. 19, 2020 in U.S. Appl. No. 16/846,579.
Notice of Allowance dated Jun. 25, 2020 in U.S. Appl. No. 16/719,462.
Notice of Allowance dated Jun. 30, 2020 in U.S. Appl. No. 16/837,561.
Office Action dated Jul. 9, 2020 in Korean Application 10-2020-7010671.
Office Action dated Jul. 9, 2020 in Korean Application 10-2020-7010666.
Office Action dated Sep. 8, 2020 in Indian Application 201938001540.
Office Action dated Sep. 8, 2020 in Indian Application 201938001563.
Decision to Grant dated Mar. 31, 2020 in Japanese Application 2018-131151.
Decision to Grant dated Mar. 31, 2020 in Japanese Application 2018-131152.
Notice of Allowance dated Apr. 8, 2020 in U.S. Appl. No. 16/149,906.
Office Action dated May 15, 2019 in European Application 20150622.7.
Office Action dated May 7, 2020 in Chinese Application 201810801490.3.
Office Action dated Apr. 7, 2020 in U.S. Appl. No. 16/774,880.
Notice of Allowance dated May 21, 2020 in Taiwanese Application 107132298.
Office Action dated Jun. 2, 2020 in Chinese Application 201810801551.6.
Notice of Allowance dated Jul. 20, 2020 in Taiwanese Application 109114126.
Decision to Grant dated Jul. 21, 2020 in Japanese Application 2018-221820.
Office Action issued in corresponding Indian Patent Application No. 202038041473 dated Jan. 6, 2022.
Office Action (Hearing Notice) issued in corresponding Indian Patent Application No. 960/KOLN/2013 dated Feb. 16, 2022.
Office Action issued in corresponding Japanese Patent Application No. 2020-046738 dated Oct. 26, 2021, with English translation.
Takeshi Chujoh et al., "Description of video coding technology proposal by Toshiba", Joint Collaborative Team on Video Coding (JCT-VC), Apr. 15, 2010, [JCTVC-A117r1] (version 1), pp. 4-6, 1st Meeting: Dresden, DE, Apr. 15-23, 2010.
Office Action issued in corresponding Japanese Patent Application No. 2020-156724 dated Oct. 5, 2021, with English translation.
Office Action issued in corresponding Japanese Patent Application No. 2020-046738 dated Mar. 1, 2022, with English translation.
Office Action issued in corresponding Korean Patent Application No. 10-2020-7010671 dated Feb. 28, 2022, with English translation.
Office Action (Notice of Allowance) issued in Taiwanese Patent Application No. 110103651 dated Nov. 25,202, with English translation.
Notice of Allowance issued in corresponding Brazilian Patent Application No. 112013008461-8, dated Mar. 7, 2022, 2 pages.
Notice of Allowance issued in corresponding Brazilian Patent Application No. 122121003281-5, dated Mar. 4, 2022, 2 pages.
Notice of Allowance issued in corresponding Korean Patent Application No. 10-2020-7010666 dated May 11, 2021, with English translation.

(56) References Cited

OTHER PUBLICATIONS

Office Action issued in corresponding Korean Patent Application No. 10-2020-7010671 dated May 12, 2021, with English translation.

Office Action issued in corresponding Korean Patent Application 10-2022-7018392 dated Jan. 30, 2023, with English translation.

| | Descriptor |
|---|---|
| coding_tree(x0, y0, log2CUSize) {<br>  if( x0 + ( 1 << log2CUSize ) <= PicWidthInSamplesL &&<br>    y0 + ( 1 << log2CUSize ) <= PicHeightInSamplesL &&<br>    cuAddress( x0, y0) >= SliceAddress ) {<br>    if( !entropy_coding_mode_flag && slice_type != I )<br>      cu_split_pred_part_mode[ x0 ][ y0 ] | ce(v) |
| 400   else if( log2CUSize > Log2MinCUSize )<br>    split_coding_unit_flag[ x0 ][ y0 ] | u(1) \| ae(v) |
|   }<br>  if(adaptive_loop_filter_flag && alf_cu_control_flag ) {<br>    cuDepth = Log2MaxCUSize - log2CUSize<br>    if( cuDepth <= alf_cu_control_max_depth )<br>      if( cuDepth == alf_cu_control_max_depth \|\|<br>        split_coding_unit_flag[ x0 ][ y0 ] == 0 )<br>402         AlfCuFlagIdx++<br>  }<br>  if( split_coding_unit_flag[ x0 ][ y0 ] ) {<br>    if( cu_qp_depta_enabled_flag &&<br>      log2CUSize == log2MinCUDQPSize )<br>    IsCuQpDeltaCoded 0<br>    x1 = x0 + (( 1 << log2CUSize ) >> 1 )<br>    y1 = y0 + (( 1 << log2CUSize ) >> 1 )<br>    if( cuAddress( x1, y0 ) > SliceAddress )<br>      moreDataFlag = coding_tree( x0, y0, log2CUSize - 1 )<br>    if( cuAddress( x0, y1 ) > SliceAdrress && moreDataFlag &&<br>      x1 < PicWidthInSamplesL )<br>      moreDataFlag = coding_tree( x1, y0, log2CUSize - 1 )<br>    if( cuAddress( x1, y1 ) > SliceAddress && moreDataFlag &&<br>      y1 < PicHeightInSamplesL )<br>      moreDataFlag = coding_tree( x0, y1, log2CUSize - 1 )<br>    if( moreDataFlag &&<br>      x1 < PicWidthInSamplesL && y1 < PicHeightInSamplesL )<br>      moreDataFlag = coding_tree( x1, y1, log2CUSize - 1 )<br>  } else {<br>    if(adaptive_loop_filter_flag && alf_cu_control_flag )<br>      AlfCuFlag[ x0 ][ y0 ] = alf_cu_flag[ AlfCuFlagIdx ]<br>404     coding_unit( x0, y0, log2CUSize )<br>    if( !entropy_coding_mode_flag )<br>      moreDataFlag = more_rbsp_data( )<br>    else {<br>      if( granularity_block_boundary( x0, y0, log2CUSize ) ) {<br>        end_of_slice_flag | ae(v) |
|         moreDataFlag = !end_of_slice_flag<br>      } else<br>        moreDataFlag = 1<br>    }<br>  }<br>  return moreDataFlag<br>} | |

FIGURE 9

| | Descriptor |
|---|---|
| coding_unit( x0, y0, log2CUSize ) { | |
|   if( entropy_coding_mode_flag && slice_type != I ) | |
|     merge_flag[ x0 ][ y0 ] | u(1) \| ae(v) |
|   406 if( merge_flag[ x0 ][ y0 ] ) | |
|     prediction_unit( x0, y0, log2CUSize, log2CUSize, 0, 0 ) | |
|   408 else { | |
|     if( !entropy_coding_mode_flag ) { | |
|       if( slice_type == I && log2CUSize == Log2MinCUSize ) | |
|         intra_part_mode | u(1) |
|     } else if( slice-type != I \|\| log2CUSize == Log2MinCUSize ) | |
|       pred_type | u(1) \| ae(v) |
|   410 x1 = x0 + ( ( 1 << log2CUSize ) >> 1 ) | |
|     y1 = y0 + ( ( 1 << log2CUSize ) >> 1 ) | |
|     if( PartMode == PART_2Nx2N ) { | |
|       prediction_unit( x0, y0, log2CUSize, log2CUSize, 0 ) | |
|   412 } else if( PartMode == PART_2NxN ) { | |
|       prediction_unit( x0, y0, log2CUSize, log2CUSize - 1, 0 ) | |
|       prediction_unit( x0, y1, log2CUSize, log2CUSize - 1, 1 ) | |
|     } else if( partmode == PART_Nx2N ) { | |
|       prediction_unit( x0, y0, log2CUSize - 1, log2CUSize, 0 ) | |
|       prediction_unit( x1, y0, log2CUSize - 1, log2CUSize, 1) | |
|     } else { /* PART_NxN */ | |
|       prediction_unit( x0, y0, log2CUSize - 1, log2CUSize - 1, 0 ) | |
|       prediction_unit( x1, y0, log2CUSize - 1, log2CUSize - 1, 1) | |
|       prediction_unit( x0, y1, log2CUSize - 1, log2CUSize - 1, 2 ) | |
|       prediction_unit( x1, y1, log2CUSize - 1, log2CUSize - 1, 3 ) | |
|     } | |
|     ⋮ | |
|   } | |
| } | |

FIGURE 10

| | Descriptor |
|---|---|
| prediction_unit(x0, y0, log2PUWidth, log2PUHeight, PartIdx) { | |
|   if(merge_flag[ x0 ][ y0 ] ) { | |
| 414    merge_idx[ x0 ][ y0 ] | ue(v) \| ae(v) |
|   } else if( PredMode == MODE_INTRA ) { | |
| 416  if( PartMode == PART_2Nx2N &&<br>    log2PUWidth >= Log2IPCMCUSize )<br>    pcm_flag | u(1) \| ae(v) |
|   if( pcm_flag ) {<br>    while ( !byte_aligned( ) )<br>      pcm_alignment_zero_bit | u(v) |
|     for( i = 0; i < 1 << (log2CUSize << 1 ); i++ )<br>      pcm_sample_luma[ i ] | u(v) |
|     for( i = 0; i < ( 1 << ( log2CUSize << 1 )) >> 1; i++ )<br>      pcm_sample_chroma[ i ] | u(v) |
|   } else {<br>    prev_intra_luma_pred_flag[ x0 ][ y0 ] | u(1) \| ae(v) |
|     if( prev_intra_luma_pred_flag[ x0 ][ y0 ] )<br>      if( NumMPMCand < 1 )<br>        mpm_idx[ x0 ][ y0 ] | u(1) \| ae(v) |
|     Else<br>      rem_intra_luma_pred_mode[ x0 ][ y0 ] | ce(v) \| ae(v) |
|     if( IntraPredMode[ x0 ][ y0 ] == 2 )<br>      planar_flag_luma[ x0 ][ y0 ] | u(1) \| ae(v) |
|     intra_chroma_pred_mode[ x0 ][ y0 ] | ue(v) \| ae(v) |
|     SignaledAsChromaDC =<br>      (chroma_pred_from_luma-enabled_flag ?<br>        intra_chroma_pred_mode[ x0 ][ y0 ] == 3 :<br>        intra_chroma_pred_mode[ x0 ][ y0 ] == 2 )<br>    if( IntraPredMode[ x0 ][ y0 ] != 2 &&<br>      IntraPredMode[ x0 ][ y0 ] != 34 && SignaledAsChromaDC )<br>422    planar_flag_chroma[ x0 ][ y0 ] | u(1) \| ae(v) |
|   }<br>  } else { /* MODE_INTER */<br>    if(entropy_coding_mode_flag \|\| PartMode != PART_2Nx2N )<br>418    merge_flag[ x0 ][ y0 ] | u(1) \| ae(v) |
|     if( merge_flag[ x0 ][ y0 ] ) {<br>420    merge_idx[ x0 ][ y0 ] | ue(v) \| ae(v) |
|     } else {<br>      if( slice_type == B ) {<br>        if( !entropy_coding_mode_flag ) {<br>          combined_inter_pred_ref_idx | ue(v) |
|         if( combined_inter_pred_ref_idx == MaxPredRef )<br>          inter_pred_flag[ x0 ][ y0 ] | ue(v) |
|         } else | |

| | | |
|---|---|---|
| | inter_pred_flag[ x0 ][ y0 ] | ue(v) \| ae(v) |
| | } | |
| | if( inter_pred_flag[ x0 ][ y0 ] == Pred_LC ) { | |
| |   if( num_ref_idx_lc_active_minus1 > 0 ) { | |
| |     if( !entropy_coding_mode_flag ) { | |
| |       if( combined_inter_pred_ref_idx == MaxPredRef ) | |
| |         ref_idx_lc_minus4[ x0 ][ y0 ] | ue(v) |
| |     } else | |
| |       ref_idx_lc[ x0 ][ y0 ] | ae(v) |
| |   } | |
| | mvd_lc[ x0 ][ y0 ][ 0 ] | se(v) \| ae(v) |
| 424 | mvd_lc[ x0 ][ y0 ][ 1 ] | se(v) \| ae(v) |
| | mvp_idx_lc[ x0 ][ y0 ] | ue(v) \| ae(v) |
| | } | |
| | else { /* Pred_L0 or Pred_BI */ | |
| |   if( num_ref_idx_l0_active_minus1 > 0 ) { | |
| |     if( !entropy_coding_mode_flag ) { | |
| |       if( combined_inter_pred_ref_idx == MaxPredRef ) | |
| |         ref_idx_l0_minusX[ x0 ][ y0 ] | ue(v) |
| |     } else | |
| |       ref_idx_l0_minusX[ x0 ][ y0 ] | ue(v) \| ae(v) |
| |   } | |
| | mvd_l0[ x0 ][ y0 ][ 0 ] | se(v) \| ae(v) |
| | mvd_l0[ x0 ][ y0 ][ 1 ] | se(v) \| ae(v) |
| | mvp_idx_l0[ x0 ][ y0 ] | ue(v) \| ae(v) |
| | } | |
| | if( inter_pred_flag[ x0 ][ y0 ] == Pred_BI ) { | |
| |   if( num_ref_idx_l1_active_minus1 > 0 ) { | |
| |     if( !entropy_coding_mode_flag ) { | |
| |       if( combined_inter_pred_ref_idx == MaxPredRef ) | |
| |         ref_idx_l1_minusX[ x0 ][ y0 ] | ue(v) |
| |     } else | |
| |       ref_idx_l1[ x0 ][ y0 ] | ue(v) \| ae(v) |
| |   } | |
| | mvd_l1[ x0 ][ y0 ][ 0 ] | se(v) \| ae(v) |
| | mvd_l1[ x0 ][ y0 ][ 1 ] | se(v) \| ae(v) |
| | mvp_idx_l1[ x0 ][ y0 ] | ue(v) \| ae(v) |
| | } | |
| | } | |
| | } | |
| | } | |

FIGURE 11B

| FIGURE 11 | FIGURE 11A |
|---|---|
| | FIGURE 11B |

PICTURE CODING SUPPORTING BLOCK PARTITIONING AND BLOCK MERGING

CROSS REFERENCE TO RELATED APPLICATIONS

The present application is a continuation of U.S. patent application Ser. No. 17/038,777 filed Sep. 30, 2020, which is a continuation of U.S. patent application Ser. No. 16/846,579 filed Apr. 13, 2020, now U.S. Pat. No. 10,827,187, which is a continuation of U.S. patent application Ser. No. 13/857,506 filed Apr. 5, 2013, now U.S. Pat. No. 10,735,748, which is a continuation of International Application PCT/EP2011/067647, filed Oct. 10, 2011, which claims priority from U.S. Provisional Patent Application 61/391,473, filed Oct. 8, 2010, all of which are incorporated herein by reference in their entireties.

BACKGROUND OF THE INVENTION

The present application concerns picture and/or video coding and in particular codecs supporting block partitioning and block merging.

Many picture and/or video codecs treat the pictures in units of blocks. For example, predictive codecs use a block granularity in order to achieve a good compromise between very precisely set prediction parameters set at a high spatial resolution with, however, spending too much side information for the prediction parameters on the one hand and too coarsely set prediction parameters, causing the amount of bits necessitated to encode the prediction residual to increase due to the lower spatial resolution of the prediction parameters, on the other hand. In effect, the optimum setting for the prediction parameters lies somewhere between both extremes.

Several attempts have been made in order to obtain the optimum solution for the above-outlined problem. For example, instead of using a regular subdivision of a picture into blocks regularly arranged in rows and columns, multi-tree partitioning subdivision seeks to increase the freedom of subdividing a picture into blocks at a reasonable demand for subdivision information. Nevertheless, even multi-tree subdivision necessitates the signalization of a remarkable amount of data and the freedom in subdividing a picture is quite restricted even in case of using such multi-tree subdivisioning.

In order to enable a better tradeoff between the amount of side information necessitated in order to signalize the picture subdivision on the one hand and the freedom in subdividing the picture on the other hand, merging of blocks may be used in order to increase the number of possible picture subdivisionings at a reasonable amount of additional data necessitated in order to signalize the merging information. For blocks being merged, the coding parameters need to be transmitted within the bitstream in full merely once, similarly as if the resulting merged group of blocks was a directly sub-divided portion of the picture.

However, there is still a need for achieving better coding efficiency, due to remaining redundancies newly caused by the combination of block merging and block subdivisioning.

SUMMARY

According to an embodiment, a decoder configured to decode a bitstream signaling one of supported partitioning patterns for a current block of a picture may be configured to: if the signaled one of the supported partitioning patterns specifies a subdivision of the current block into two or more block partitions, remove for each of the block partitions except a first block partition of the bock partitions of the current block in a coding order, from a set of coding parameter candidates for the respective block partition, coding parameter candidates which equal coding parameters associated with any of the block partitions, which would, when being merged with the respective block partition, result in one of the supported partitioning patterns, wherein the decoder is configured to determine, for the respective block partition of the current block, a set of coding parameter candidates including adopting at least some of the coding parameter candidates from coding parameters of previously decoded block partitions by adopting each of the at least some coding parameters from the coding parameters of merely one previously decoded block partition so that the at least some coding parameter candidates thus adopted are equal to the coding parameters of the previously decoded block partitions, and deriving further at least some of the coding parameter candidates from a combination of coding parameters of more than one previously decoded block partitions.

According to another embodiment, an encoder configured to encode a picture into a bitstream may be configured to: signaling within a bitstream one of supported partitioning patterns for a current block; and if the signaled one of the supported partitioning patterns specifies a subdivision of the current block into two or more block partitions, remove for each of the block partitions except a first block partition of the bock partitions of the current block in a coding order, from a set of coding parameter candidates for the respective block partition, coding parameter candidates which equal coding parameters associated with any of the block partitions, which would, when being merged with the respective block partition, result in one of the supported partitioning patterns, wherein the encoder is further configured to determine, for the respective block partition of the current block, a set of coding parameter candidates including adopting at least some of the coding parameter candidates from coding parameters of previously encoded block partitions by adopting each of the at least some coding parameters from the coding parameters of merely one previously encoded block partition so that the at least some coding parameter candidates are equal to the coding parameters of the previously encoded block partitions, and deriving further at least some of the coding parameter candidates from a combination of coding parameters of more than one previously encoded block partitions.

According to another embodiment, a method for decoding a bitstream signaling one of supported partitioning patterns for a current block of a picture may have the steps of: if the signaled one of the supported partitioning patterns specifies a subdivision of the current block into two or more block partitions, remove for each of the block partitions except a first block partition of the bock partitions of the current block in a coding order, from a set of coding parameter candidates for the respective block partition, coding parameter candidates which equal coding parameters associated with any of the block partitions, which would, when being merged with the respective block partition, result in one of the supported partitioning patterns, wherein the method has determining, for the respective block partition of the current block, a set of coding parameter candidates including adopting at least some of the coding parameter candidates from coding parameters of previously decoded block partitions by adopting each of the at least some coding parameters from the coding parameters of merely one previously decoded block partition so that the at least some coding parameter candidates are equal to the coding parameters of the previously decoded block partitions, and deriving further at least some of the coding parameter candidates from a combination of coding parameters of more than one previously decoded block partitions.

According to another embodiment, a method for encoding a picture into a bitstream may have the steps of: signaling within a bitstream one of supported partitioning patterns for a current block; and if the signaled one of the supported partitioning patterns specifies a subdivision of the current block into two or more block partitions, remove for each of the block partitions except a first block partition of the bock partitions of the current block in a coding order, from a set of coding parameter candidates for the respective block partition, coding parameter candidates which equal coding parameters associated with any of the block partitions, which would, when being merged with the respective block partition, result in one of the supported partitioning patterns, wherein the method has determining, for the respective block partition of the current block, a set of coding parameter candidates including adopting at least some of the coding parameter candidates from coding parameters of previously decoded block partitions by adopting each of the at least some coding parameters from the coding parameters of merely one previously encoded block partition so that the at least some coding parameter candidates are equal to the coding parameters of the previously decoded block partitions, and deriving further at least some of the coding parameter candidates from a combination of coding parameters of more than one previously decoded block partitions.

Another embodiment may have a computer program having a program code for performing, when running on a computer, the methods of decoding and encoding as mentioned above.

The idea underlying the present invention is that a further coding efficiency increase may be achieved if for a current block of a picture, for which the bit stream signals one of supported partitioning patterns, a reversal of the partitioning by block merging is avoided. In particular, if the signaled one of the supported partitioning patterns specifies a subdivision of the block into two or more further blocks, a removal of certain coding parameter candidates for all further blocks, except a first further block of the further blocks in a coding order, is performed. In particular, those coding parameter candidates are removed from the set of coding parameter candidates for the respective further block, the coding parameters of which are the same as coding parameters associated with any of the further blocks which, when being merged with the respective further block, would result in one of the supported partitioning pattern. By this measure, redundancy between partitioning coding and merging coding is avoided and the signaling overhead for signaling the merge information may additionally be reduced by exploiting the reduced size of the set of coding parameter candidates. Moreover, the positive effects of combining block partitioning with block merging are maintained. That is, due to combining the block partitioning with the block merging, the variety of achievable partitioning patterns is increased relative to the case without block merging. The increase in signalization overhead is kept in reasonable limits. Lastly, block merging enables uniting further blocks beyond the boundary of the current block, thereby offering granularities which would not be possible without block merging.

Applying a slightly different view of the set of merge candidates, the above-explained idea manifests itself, in accordance with a further aspect of the present invention, in a decoder configured to decode a bit stream signaling one of supported partitioning patterns for a current block of a picture with the decoder being configured to remove, if the signaled one of the supported partitioning patterns specifies a subdivision of the block into two or more further blocks, for all further blocks except a first further block of the further blocks in a cording order, from a set of candidate blocks for the respective further blocks, candidate blocks which would, when being merged with the respective further blocks, result in one of the supported partitioning patterns.

BRIEF DESCRIPTION OF THE DRAWINGS

Embodiments of the present application are described in the following in more detail with respect to the figures among which:

FIGS. 9, 10, 11A, and 11B show syntax portions of a syntax in accordance with an embodiment.

DETAILED DESCRIPTION OF THE INVENTION

With respect to the following description, it is noted that whenever the same reference sign is used in connection with different figures, the explanations with regard to the respective element presented with respect to one of these figures shall equally apply to the other figures, provided that such transferring of explanations from one figure to the other does not conflict with the remaining description of this other figure.

Figure 1:
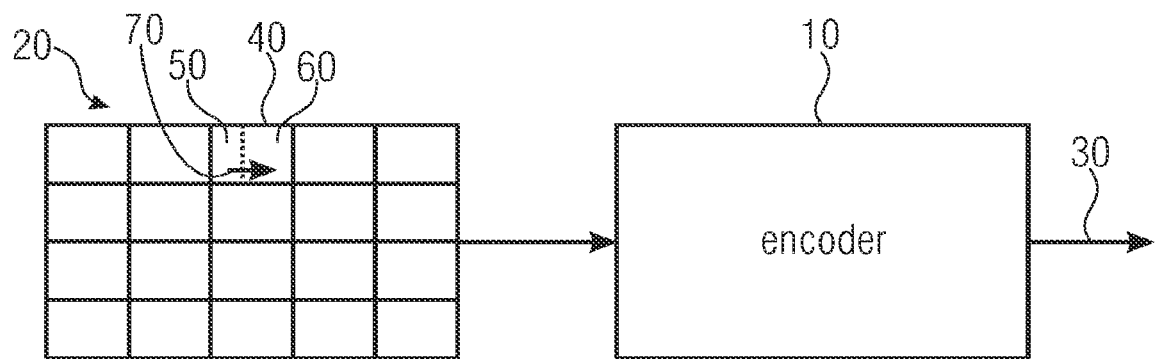
FIG. 1 shows a block diagram of an encoder according to an embodiment.

FIG. 1 shows an encoder 10 according to an embodiment of the present invention. The encoder 10 is configured to encode a picture 20 into a bit stream 30. Naturally, picture 20 could be part of a video in which case the encoder would be a video encoder.

The picture 20 comprises a block 40, which is currently to be encoded by encoder 10. As shown in FIG. 1, picture 20 may comprise more than one block 40. For example, the picture 20 may be sub-divided into a regular arrangement of blocks 40 so that the blocks 40 are arranged in rows and columns as exemplarily shown in FIG. 1. However, any other subdivision of the picture 20 into blocks 40 may also be possible. In particular, subdivision of the picture 20 into blocks 40 may be fixed, i.e., known to the decoder by default or may be signaled within the bit stream 30 to the decoder. In particular, blocks 40 of picture 20 may vary in size. For example, a multi-tree subdivision such as a quad-tree subdivision may be applied to picture 20 or to a regular pre-subdivisioning of picture 20 into regularly arranged tree-root blocks so as to obtain blocks 40, which, in this case, form the leaf blocks of the multi-tree subdivision.

In any case, the encoder 10 is configured to signal within the bit stream 30 one of supported partitioning patterns for the current block 40. That is, encoder 10 decides as to whether-it is in some, for example, rate-distortion optimization sense better to further partition block 40, and as to which of supported partitioning patterns should be used for a current block 40 in order to adapt the granularity at which certain coding parameters are set within the current block 40 of picture 20. As will be outlined in more detail below, the coding parameters may, for example, represent prediction parameters such as inter prediction parameters. Such inter-prediction parameters may, for example, comprise a reference picture index, a motion vector and the like. The supported partitioning patterns may, for example, comprise anon-partitioning mode, i.e., an option according to which the current block 40 is not further partitioned, a horizontally partitioning mode, i.e., an option according to which the current block 40 is sub-divided along a horizontally extending line into an upper or top portion and a bottom or lower portion and a vertically partitioning mode, i.e., an option according to which the current block 40 is vertically sub-divided along a vertically extending line into a left portion and a right portion. Beyond this, the supported partitioning patterns may also comprise an option according to which the current block 40 is further regularly sub-divided into four further blocks each assuming one quarter of current block 40. Further, the partitioning may pertain all blocks 40 of the picture 20 or merely a proper subset thereof such as those having a certain coding mode associated therewith, such as the inter prediction mode. Moreover, the set of possible blocks, for which merging is to be applied for the block's partition(s) may additionally be confined by bitstream signalization for each block 40 for which merging could be performed, as to whether merging shall be available for the block's partitions or not. Naturally, such signalization could also be done for each potential merge candidate partition individually. Further, different subsets of the supported partitioning modes may be available for blocks 40, depending, for example, on the block size, the subdivision level of the block 40 in case of the same being a multi-tree subdivision leaf block, in combination or individually.

That is, while the subdivision of picture 20 into blocks so as to obtain, inter alias, block 40 may be fixed or signaled within the bit stream, the partitioning pattern to be used for current block 40 is signaled within the bit stream 30 in the form of partitioning information. Accordingly, the partitioning information may, thus, be thought of as being a kind of extension of the subdivision of picture 20 into blocks 40. On the other hand, an additional relevance of the original granularity of subdivision of picture 20 into blocks 40 may still remain. For example, the encoder 10 may be configured to signalize within the bit stream 30 the coding mode to be used for the respective portion or block 40 of picture 20 at the granularity defined by block 40 while the encoder 10 is configured to vary the coding parameters of the respective coding mode within the respective block 40 at an increased (finer) granularity defined by the respective partitioning pattern chosen for the respective block 40. For example, the coding mode signaled at the granularity of blocks 40 may distinguish between infra prediction mode, inter prediction mode and the like, such as temporal inter prediction mode, inter-view prediction mode etc. The sort of coding parameters associated with the one or more sub-blocks (partitions) resulting from the partitioning of the respective block 40, then depends on the coding mode assigned to the respective block 40. For example, for an intra-coded block 40, the coding parameters may comprise a spatial direction along which picture content of previously decoded portions of picture 20 are used to fill the respective block 40. In case of an inter-coded block 40, the coding parameters may comprise, inter alias, a motion vector for motion-compensated prediction.

FIG. 1 exemplarily shows the current block 40 as being sub-divided into two further (smaller) blocks 50 and 60. In particular, a vertically partitioning mode is exemplarily shown. The smaller blocks 50 and 60 may also be called sub-blocks 50 and 60 or partitions 50 and 60 or prediction units 50 and 60. In particular, the encoder 10 is configured to remove, in such cases where the signaled one of the supported partitioning patterns specifies a subdivision of the current block 40 into two or more further blocks 50 and 60, for all further blocks except a first further block of the further blocks 50 and 60 in a coding order, from a set of coding parameter candidates for the respective further block, coding parameter candidates having coding parameters which are the same as coding parameters associated with any of the further blocks which would, when being merged with the respective further blocks, result in one of the supported partitioning patterns. To be more precise, for each of the supported partitioning patterns a coding order is defined among the resulting one or more partitions 50 and 60. In the case of FIG. 1, the coding order is exemplarily illustrated by an arrow 70, defining that the left partition 50 is coded prior to the right partition 60. In case of a horizontally partitioning mode, it could be defined that the upper partition is coded prior to the lower partition. In any case, the encoder 10 is configured to remove for the second partition 60 in coding order 70, from the set of coding parameter candidates for the respective second partition 60, coding parameter candidates having coding parameters which are the same as coding parameters associated with the first partition 50 in order to avoid the result of this merging, namely the fact that both partitions 50 and 60 would have the same coding parameters associated therewith which, in fact, could equally yield by choosing the non-partitioning mode for current block 40 at a lower coding rate.

To be more precise, encoder 10 is configured to use block merging in an effective way along with block partitioning. As far as the block, merging is concerned, encoder 10 determines for each partition 50 and 60, a respective set of coding parameter candidates. The encoder may be configured to determine the sets of coding parameter candidates for each of the partitions 50 and 60 based on coding parameters associated with previously decoded blocks. In particular, at least some of the coding parameter candidates within the sets of coding parameter candidates may be equal to, i.e. may be adopted from, the coding parameters of previously decoded partitions. Additionally or alternatively, at least some of the coding parameter candidates may be derived from coding parameter candidates associated with more than one previously coded partition, by way of a suitable combination such as a median, mean or the like. However, since the encoder 10 is configured to perform the determination of the reduced set of coding parameter candidates and, if more than one such coding parameter candidate remains after removal, the choice among the remaining non-removed coding parameter candidates, for each of the non-first partitions 60 in order to set coding parameters associated with the respective partition depending on the one non-removed or chosen coding parameter candidate, the encoder 10 is configured to perform the removal such that coding parameter candidates which would lead, effectively, to a re-uniting of partitions 50 and 60, are removed. That is, syntax constellations are effectively avoided according to which an effective partitioning situation is coded more complex than in case of directly signaling this partitioning merely by use of the partitioning information alone.

Moreover, as the sets of coding parameter candidates gets smaller, the amount of side information necessitated to encode the merging information into the bit stream 30 may decrease due to the lower number of elements in these candidate sets. In particular, as the decoder is able to determine and subsequently reduce the sets of coding parameter candidates in the same way as the encoder of FIG. 1 does, the encoder 10 of FIG. 1 is able to exploit the reduced sets of coding parameter candidates by, for example, using less bits in order to insert a syntax element into the bit stream 30, specifying which of the non-removed coding parameter candidates is to be employed for merging. Naturally, the introduction of the syntax element into bit stream 30 may be completely suppressed in case the number of non-removed coding parameter candidates for the respective partition is merely one. In any case, due to the merging, i.e., setting the coding parameters associated with the respective partition dependent on the remaining one, or chosen one, of the non-removed coding parameter candidates, the encoder 10 is able to suppress the completely anew insertion of coding parameters for the respective partition into bit stream 30, thereby reducing the side information as well. In accordance with some embodiments of the present application, the encoder 10 may be configured to signalize within the bit stream 30 refinement information for refining the remaining one, or chosen one of the coding parameter candidates for the respective partitions.

In accordance with the description of FIG. 1 as set out above, the encoder 10 is configured to determine the merge candidates to be removed by way of a comparison of their coding parameters with the coding parameters of the partition, the merging with which would yield another supported partitioning pattern. This way of treating the coding parameter candidates would, effectively, remove at least one coding parameter candidate in the illustrative case of FIG. 1, for example, provided that the coding parameters of the left partition 50 form one element of the set of coding parameter candidates for the right partition 60. Further coding parameter candidates may, however, also be removed in case they are equal to the coding parameters of left partition 50. In accordance with another embodiment of the present invention, however, encoder 10 could be configured to determine a set of candidate blocks for each second and following partition in coding order, with removing that or those candidate blocks from this set of candidate blocks, which would, when being merged with the respective partition, result in one of the supported partitioning patterns. In some sense, this means the following. The encoder 10 may be configured to determine merge candidates for a respective partition 50 or 60 (i.e. the first and the following ones in coding order) such that each element of the candidate set has exactly one partition of the current block 40 or any of the blocks 40 previously coded, associated therewith in that the candidate adopts the respective coding parameters of the associated partition. For example, each element of the candidate set could be equal to, i.e. adopted from, one of such coding parameters of previously coded partitions, or could at least be derived from the coding parameters of merely one such previously coded partition such as by additionally scaling or refinement using additionally sent refinement information. The encoder 10 could, however, also be configured to accompany such candidate set with further elements or candidates, namely coding parameter candidates which have been derived from a combination of coding parameters of more than one previously coded partition, or which have been derived—by modification—from coding parameters of one previously coded partition such as by taking merely the coding parameters of one motion parameter list. For the "combined" elements, there is no 1:1 association between the coding parameters of the respective candidate element and a respective partition. In accordance with the first alternative of the description of FIG. 1, the encoder 10 could be configured to remove all candidates from the whole candidate set, the coding parameters of which equal the coding parameters of partition 50. In accordance with the latter alternative of the description of FIG. 1, the encoder 10 could be configured to remove merely the element of the candidate set which is associated with partition 50. Harmonizing both points of views, the encoder 10 could be configured to remove candidates from the portion of the candidate set, showing a 1:1 association to some (e.g. neighboring) previously coded partitions, with not extending the removal (and search for candidates having equal coding parameters) to the remaining portion of the candidate set having coding parameters being obtained by combination. But of course, if one combination also would lead to redundant representation, this could be solved by removing redundant coding parameters from the list or by performing the redundancy check for the combined candidates as well.

Figure 2:
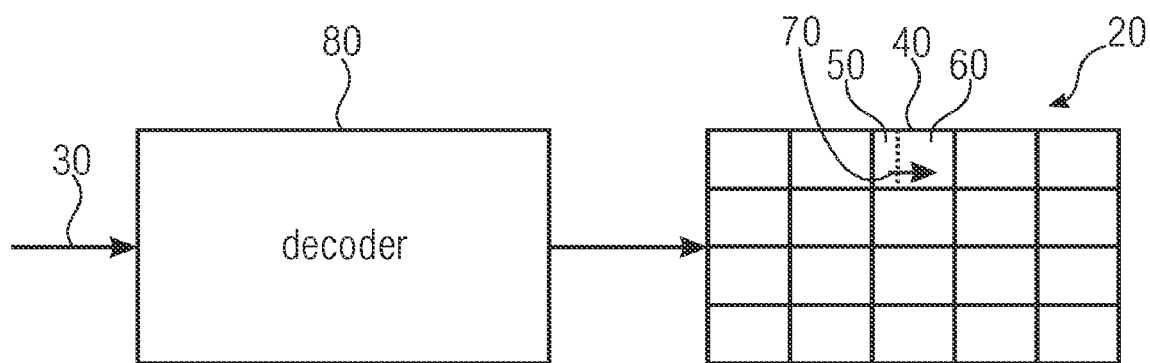
FIG. 2 shows a block diagram of a decoder according to an embodiment.

After having described an encoder according to an embodiment of the present invention, referring to FIG. 2, a decoder 80 according to an embodiment is described. The decoder 80 of FIG. 2 is configured to decode the bit stream 30, which, as described above, signals one of supported partitioning patterns for a current block 40 of picture 20. The decoder 80 is configured to, if the signaled one of the supported partitioning pattern specifies a subdivision of the current block 40 into two or more partitions 50 and 60, remove for all partitions except the first partition 50 of the partitions in coding order 70, i.e. for partition 60 in the illustrated example of FIGS. 1 and 2, from a set of coding parameter candidates for the respective partition coding parameter candidates having coding parameters which are the same as, or equal to, coding parameters associated with any of the partitions, which would, when being merged with the respective partition, result in one of the supported partitioning patterns, namely one not having been signalized within the bit stream 30 but being, nevertheless, one of the supported partitioning patterns.

That is, the decoder functionality largely coincides with that of the encoder described with respect to FIG. 1. For example, the decoder 80 may be configured to, if a number of the non-removed coding parameter candidates is non-zero, set coding parameters associated with the respective partition 60 depending on one of the non-removed parameter candidates. For example, the decoder 80 sets the coding parameters of partition 60 so as to be equal to one of the non-removed coding parameter candidate, with or without additional refinement and/or with or without scaling in accordance with a temporal distance to which the coding parameters refer, respectively. For example, the coding parameter candidate to merge with out of the non-removed candidates may have another reference picture index associated therewith than a reference picture index explicitly signaled within the bit stream 30 for partition 60. In that case, the coding parameters of the coding parameter candidates may define motion vectors, each related to a respective reference picture index, and the decoder 80 may be configured to scale the motion vector of the finally chosen non-removed coding parameter candidate in accordance with the ratio between both reference picture indices. Thus, in accordance with the just-mentioned alternative, the coding parameters being subject to merging, would encompass the motion parameters, whereas reference picture indices would be separate therefrom. However, as indicated above, in accordance with alternative embodiments, the reference picture indices could also be a part of the coding parameters being subject to merging.

It equally applies for the encoder of FIG. 1 and the decoder of FIG. 2 that the merge behavior may be restricted to inter-predicted blocks 40. Accordingly, the decoder 80 and the encoder 10 may be configured to support intra and inter prediction modes for the current block 40 and perform merging and removal of candidates merely in case of the current block 40 being coded in inter prediction mode. Accordingly, merely the coding/prediction parameters of such inter-predicted previously coded partitions may be used to determine/construct the candidate list.

As already discussed above, the coding parameters may be prediction parameters and the decoder 80 may be configured to use the prediction parameters of the partitions 50 and 60 in order to derive a prediction signal for the respective partition. Naturally, the encoder 10 performs the derivation of the prediction signal in the same way, too. The encoder 10, however, additionally sets the prediction parameters along with all the other syntax elements within bit stream 30 in order to achieve some optimization in a suitable optimization sense.

Further, as already described above, the encoder may be configured to insert an index to a non-removed coding parameter candidate merely in case the number of non-removed coding parameter candidate for a respective partition is greater than one. Accordingly, the decoder 80 may be configured to, depending on the number of non-removed coding parameter candidates for, for example, partition 60, merely expect the bitstream 30 to comprise a syntax element specifying which of the non-removed coding parameter candidate is employed for merging, if the number of non-removed coding parameter candidates is greater than one. However, the case of the candidate set getting smaller in number than two, could be generally excluded from occurring by extending, as described above, the list/set of candidates using combined coding parameters, i.e. parameters having been derived by combination of the coding parameters of more than one—or more than two—previously coded partitions, with restricting the performance of the candidate set reduction to those candidates having been obtained by adopting, or derivation from, the coding parameters of exactly one previously coded partition. The opposite is possible as well, i.e. generally removing all coding parameter candidates having the same value as those of the partition resulting in another supported partitioning pattern.

Regarding the determination, the decoder 80 acts as encoder 10 does. That is, decoder 80 may be configured to determine the set of coding parameter candidates for the partition or the partitions following the first partition 50 in coding order 70 based on coding parameters associated with previously decoded partitions. That is, a coding order is not only defined among the partitions 50 and 60 of a respective block 40, but also among blocks 40 of picture 20 itself. All the partitions having been coded prior to partition 60 may, thus, serve the basis for the determination of the set of coding parameter candidates for any of the subsequent partitions, such as partition 60 in case of FIG. 2. As is also described above, the encoder and decoder may restrict the determination of the set of coding parameter candidates to partitions in a certain spatial and/or temporal neighborhood. For example, the decoder 80 may be configured to determine the set of coding parameter candidates for a non-first partition 60 based on the coding parameters associated with previously decoded partitions neighboring the respective non-first partition, wherein such partitions may lay outside and inside the current block 40. Naturally, the determination of merge candidates may also be performed for the first partition in coding order. Merely the removal is not performed.

Coinciding with the description of FIG. 1, the decoder 80 may be configured to determine the set of coding parameter candidates for the respective non-first partition 60 out of an initial set of previously decoded partitions, excluding ones being coded in an intra prediction mode.

Further, in case of the encoder introducing subdivision information into the bitstream in order to subdivide picture 20 into the blocks 40, the decoder 80 may be configured to recover the subdivision of picture 20 into such coding blocks 40 according to the subdivision information in the bitstream 30.

With regard to FIG. 1 and FIG. 2, it should be noted that the residual signal for current block 40 may be transmitted via bitstream 30 in a granularity, which may differ from the granularity defined by the partitions with regard to the coding parameters. For example, encoder 10 of FIG. 1 may be configured to subdivide the block 40 into one or more transform blocks in a way parallel to, or independent from, the partitioning into partitions 50 and 60. The encoder may signalize the respective transform block subdivision for block 40 by way of further subdivision information. The decoder 80, in turn, may be configured to recover this further subdivision of block 40 into one or more transform blocks according to the further subdivision information in the bitstream, and to derive a residual signal of the current block 40 from the bitstream in units of these transform blocks. The significance of the transform block partitioning may be that the transform, such as DCT, in the encoder and the corresponding inverse transform such as IDCT in the decoder are performed within each transform block of block 40 individually. In order to reconstruct picture 20 as block 40, the encoder 10 then combines, such as adds, the prediction signal derived by applying the coding parameters at the respective partitions 50 and 60, and the residual signal, respectively. However, it is noted that the residual coding may not involve any transform and inverse transform respectively, and that the prediction residuum is coded in the spatial domain instead, for example.

Figure 3:
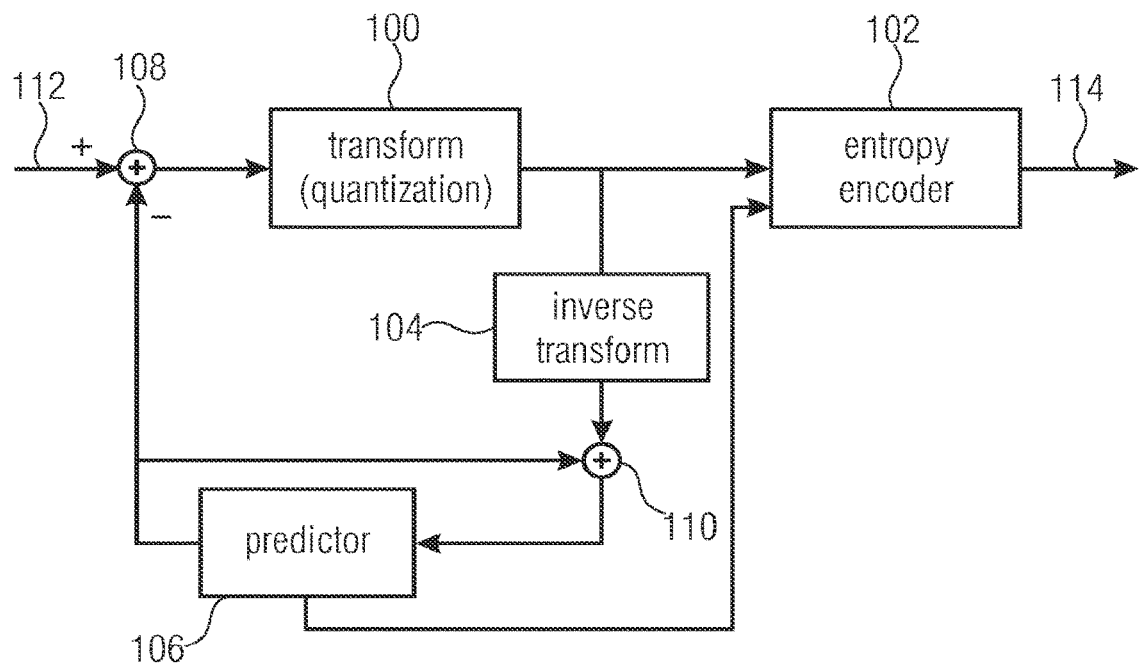
FIG. 3 shows a block diagram of a possible internal structure of the encoder of FIG. 1.

Before describing further possible details of further embodiments below, a possible internal structure of encoder and decoder of FIGS. 1 and 2, shall be described with respect to FIGS. 3 and 4. FIG. 3 shows exemplarily as to how encoder 10 may be constructed internally. As shown, encoder 10 may comprise a subtracter 108, a transformer 100, and a bitstream generator 102, which may, as indicated in FIG. 3, perform an entropy coding. Elements 108, 100 and 102 are serially connected between an input 112 receiving picture 20, and an output 114 outputting the afore-mentioned bitstream 30. In particular, subtractor 108 has its non-inverting input connected to input 112 and transformer 100 is connected between an output of subtractor 108 and a first input of bitstream generator 102 which, in turn, has an output connected to output 114. The encoder 10 of FIG. 3 further comprises an inverse transformer 104 and an adder 110 serially connected, in the order mentioned, to the output of transformer 100. Encoder 10 further comprises a predictor 106, which is connected between an output of adder 110 and a further input of adder 110 and the inverting input of subtractor 108.

The elements of FIG. 3 interact as follows: Predictor 106 predicts portions of picture 20 with the result of the prediction, i.e., the prediction signal, being applied to the inverting input of subtracter 108. The output of subtractor 108, in turn, represents the difference between the prediction signal and the respective portion of picture 20, i.e. a residual signal. The residual signal is subject to transform coding in transformer 100. That is, transformer 100 may perform a transformation, such as a DCT or the like, and a subsequent quantization on the transformed residual signal, i.e. the transform coefficients, so as to obtain transform coefficient levels. The inverse transformer 104 reconstructs the final residual signal output by transformer 100 to obtain a reconstructed residual signal, which corresponds to the residual signal input into transformer 100 except for the information loss due to the quantization in transformer 100. The addition of the reconstructed residual signal and the prediction signal as output by predictor 106 results in a reconstruction of the respective portion of picture 20 and is forwarded from the output of adder 110 to the input of predictor 106. Predictor 106 operates in different modes as described above, such as an infra prediction mode, inter prediction mode and the like. Prediction mode and the corresponding coding or prediction parameters applied by predictor 106 in order to obtain the prediction signal, are forwarded by predictor 106 to entropy encoder 102 for insertion into the bitstream.

Figure 4:
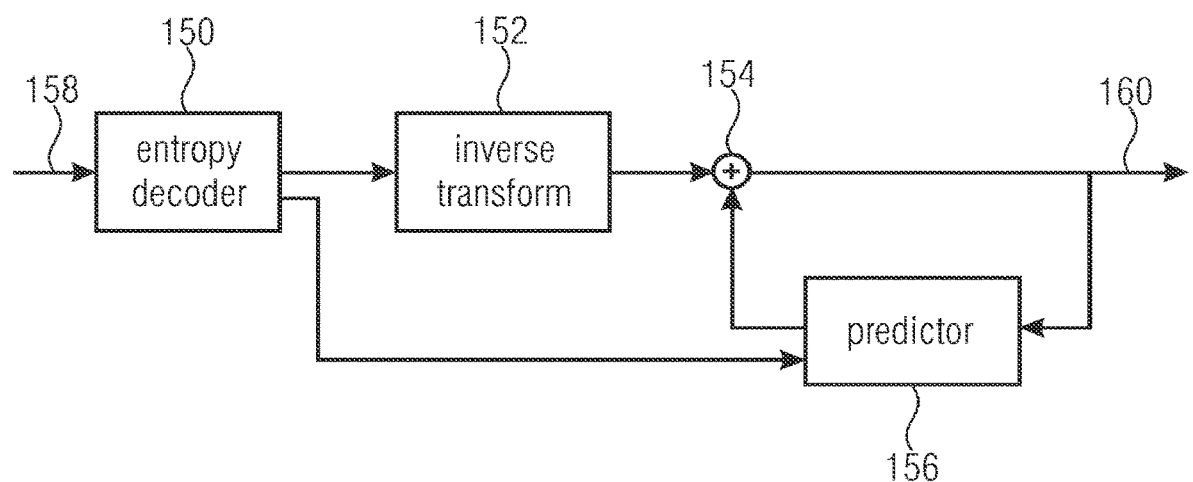
FIG. 4 shows a block diagram of a possible internal structure of the decoder of FIG. 2.

A possible implementation of the internal structure of decoder 80 of FIG. 2, corresponding to the possibility shown in FIG. 3 with respect to the encoder, is shown in FIG. 4. As shown therein, the decoder 80 may comprise a bitstream extractor 150, which may, as shown in FIG. 4, be implemented as an entropy decoder, an inverse transformer 152 and an adder 154, which are, in the order mentioned, connected between an input 158 and an output 160 of the decoder. Further, the decoder of FIG. 4 comprises a predictor 156 connected between an output of adder 154 and a further input thereof. The entropy decoder 150 is connected to a parameter input of predictor 156.

Briefly describing the functionality of the decoder of FIG. 4, the entropy decoder 150 is for extracting all the information contained in the bitstream 30. The entropy coding scheme used may be variable length coding or arithmetic coding. By this, entropy decoder 150 recovers from the bitstream transformation coefficient levels representing the residual signal and forwards same to the inverse transformer 152. Further, entropy decoder 150 recovers from the bitstream all the coding modes and associated coding parameters and forwards same to predictor 156. Additionally, the partitioning information and merging information is extracted from the bitstream by extractor 150. The inversely transformed, i.e., reconstructed residual signal and the prediction signal as derived by predictor 156 are combined, such as added, by adder 154 which, in turn, outputs the thus-recovered reconstructed signal at output 160 and forwards same to the predictor 156.

As becomes clear from comparing FIGS. 3 and 4, elements 152, 154 and 156 functionally correspond to elements 104, 110 and 106 of FIG. 3.

Figure 5A:
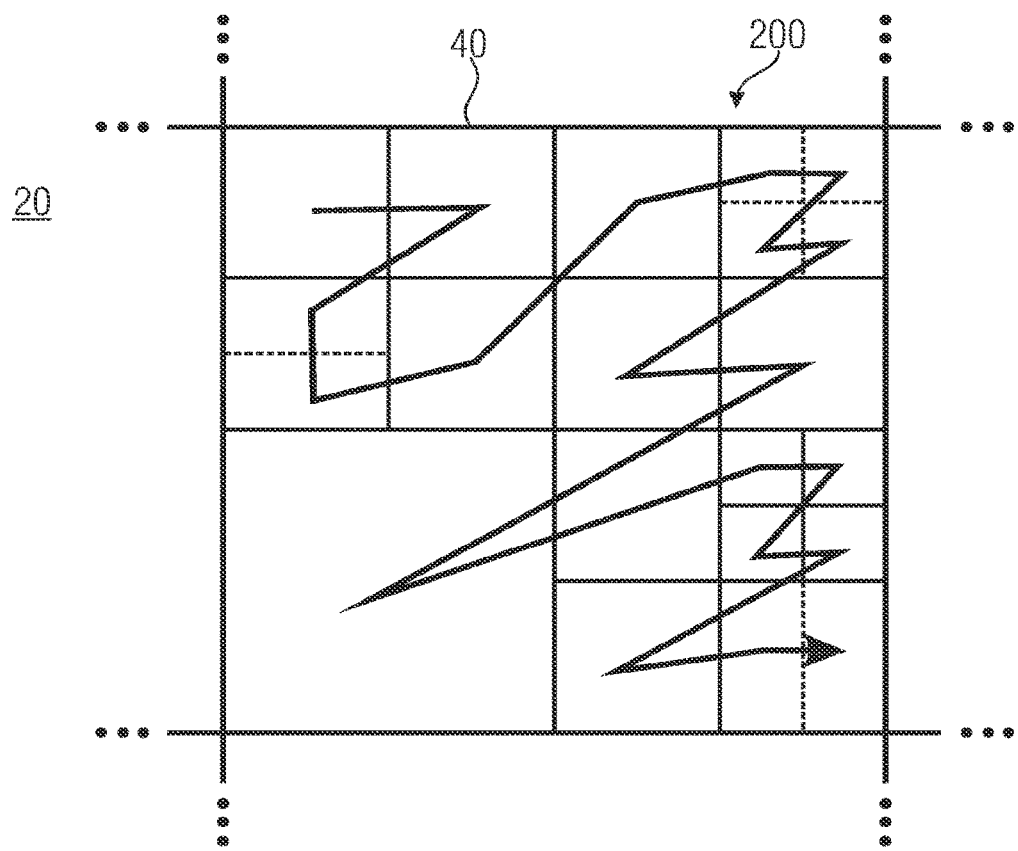
FIG. 5A shows schematically a possible subdivision of a picture into tree-root blocks, coding units (blocks) and prediction units (partitions)

In the above description of FIGS. 1 to 4, several different possibilities have been presented with regard to possible subdivisions of picture 20 and the corresponding granularity in varying some of the parameters involved in coding picture 20. One such possibility is again described with respect to FIG. 5A and FIG. 5B. FIG. 5A shows a portion out of a picture 20. In accordance with the embodiment of FIG. 5A, encoder and decoder are configured to firstly subdivide picture 20 into tree-root blocks 200. One such tree-root block is shown in FIG. 5A. The subdivision of picture 20 into tree-root blocks is done regularly in rows and columns as illustrated by dotted lines. The size of the tree-root blocks 200 may be selected by the encoder and signaled to the decoder by bitstream 30. Alternatively, the size of these tree-root blocks 200 may be fixed by default. The tree-root blocks 200 are sub-divided by use of quad-tree partitioning in order to yield the above-identified blocks 40, which may be called coding blocks or coding units. These coding blocks or coding units are drawn with thin solid lines in FIG. 5A. By this, the encoder accompanies each tree-root block 200 with subdivision information and inserts the subdivision information into the bitstream. This subdivision information indicates as to how the tree-root block 200 is to be sub-divided into blocks 40. At a granularity of, and in units of, these blocks 40, the prediction mode varies within picture 20. As indicated above, each block 40—or each block having a certain prediction mode such as inter prediction mode—is accompanied by partitioning information as to which supported partitioning pattern is used for the respective block 40. In the illustrative case of FIG. 5A, for many coding blocks 40, the non-partitioning mode has been chosen so that the coding block 40 spatially coincides with the corresponding partition. In other words, the coding block 40 is, concurrently, a partition having a respective set of prediction parameters associated therewith. The sort of prediction parameters, in turn, depends on the mode associated with the respective coding block 40. Other coding blocks, however, are exemplarily shown to be further partitioned. The coding block 40 at the top right-hand corner of the tree-root block 200, for example, is shown to be partitioned into four partitions, whereas the coding block at the bottom right-hand corner of the tree-root block 200 is exemplarily shown to be vertically sub-divided into two partitions. The subdivision for partitioning into partitions is illustrated by dotted lines. FIG. 5A also shows the coding order among the partitions thus defined. As shown, a depth-first traversal order is used. Across the tree-root block borders, the coding order may be continued in a scan order according to which the rows of tree-root blocks 200 are scanned row-wise from top to bottom of picture 20. By this measure, it is possible to have a maximum chance that a certain partition has a previously coded partition adjacent to its top border and left-hand border. Each block 40—or each block having a certain prediction mode such as inter prediction mode—may have a merge switch indicator within the bitstream indicating as to whether merging is activated for the corresponding partitions therein or not. It should be noted that the partitioning of the blocks into partitions/prediction units could be restricted to a partitioning of maximally two partitions, with merely an exception of this rule being only made for the smallest possible block size of blocks 40. This could, in case of using quad-tree subdivision in order to obtain blocks 40, avoid redundancy between subdivision information for subdividing picture 20 into block 40 and partitioning information for subdividing block 40 into partitions. Alternatively, merely partitioning into one or two partitions could be allowed, including or not including asymmetric ones.

Figure 5B:
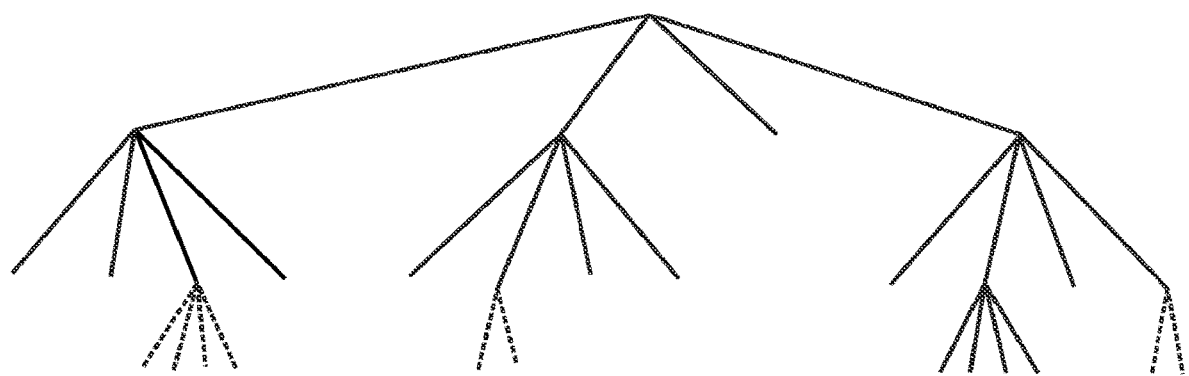
FIG. 5B shows a subdivision tree of the tree-root block shown in FIG. 5A, down to the level of the partitions, in accordance with an illustrative example.

FIG. 5B shows a subdivision tree. With solid lines, the subdivision of tree-root block 200 is illustrated, whereas dotted lines symbolize the partitioning of the leaf blocks of the quad-tree subdivisioning, which are the coding blocks 40. That is, the partitioning of the coding blocks represents a kind of extension of the quad-subdivision.

As already noted above, each coding block 40 may be parallely subdivided into transform blocks so that transform blocks may represent a different subdivision of the respective coding block 40. To each of these transform blocks, which are not shown in FIGS. 5A and 5B, a transformation in order to transform the residual signal of the coding blocks may be performed separately.

In the following, further embodiments of the present invention are described. While the above embodiments concentrated on the relation between the block merging on the one hand and the block partitioning on the other hand, the following description also includes aspects of the present application relating to other coding principles known in present codecs, such as SKIP/DIRECT modes. Nevertheless, the subsequent description shall not be regarded as merely describing separate embodiments, i.e., embodiments separated from those described above. Rather, the description below also reveals possible implementation details for the embodiments described above. Accordingly, the description below uses reference signs of the figures already described above, so that a respective possible implementation described below, shall define possible variations of embodiments described above, too. Most of these variations may be individually transferred to the above embodiments.

In other words, embodiments of the present application describe methods for reducing the side information rate in image and video coding applications by merging the syntax elements associated with particular sets of samples, i.e. blocks, for the purpose of transmitting associated coding parameters. Embodiments of the present application are particularly able to consider the combination of merging syntax elements with a partitioning of parts of a picture into various partitioning patterns and the combination with SKIP/DIRECT modes, in which coding parameters are inferred from a spatial and/or temporal neighborhood of a current block. Insofar, the above described embodiments may be modified to implement merging for sets of samples, i.e. blocks, in combination with different partitioning patterns and SKIP/DIRECT modes.

Further, before describing these variations and further details, an overview over picture and video codecs is presented.

In image and video coding applications, the sample arrays associated with a picture are usually partitioned into particular sets of samples (or sample sets), which may represent rectangular or quadratic blocks or any other collection of samples including arbitrarily shaped regions, triangles, or any other shapes. The subdivision of the samples arrays may be fixed by the syntax or the subdivision is (at least partly) signaled inside the bitstream. To keep the side information rate for signaling the subdivision information small, the syntax usually allows only a limited number of choices resulting in simple partitioning such as the subdivision of blocks into smaller blocks. An often used partitioning scheme is the partitioning of square block into four smaller square blocks, or into two rectangular blocks of the same size, or into two rectangular blocks of different sizes, where the actually employed partitioning is signaled inside the bitstream. The sample sets are associated with particular coding parameters, which may specify prediction information or residual coding modes, etc. In video coding applications, a partitioning is often done for the purpose of motion representation. All samples of a block (inside a partitioning pattern) are associated with the same set of motion parameters, which may include parameters specifying the type of prediction (e.g., list 0, list 1, or bi-prediction; and/or translational or affine prediction or a prediction with a different motion model), parameters specifying the employed reference pictures, parameters specifying the motion with respect to the reference pictures (e.g., displacement vectors, affine motion parameter vectors, or motion parameter vectors for any other motion model), which are usually transmitted as a difference to a predictor, parameters specifying the accuracy of motion parameters (e.g., half-sample or quarter-sample accuracy), parameters specifying the weighting of the reference sample signal (e.g., for the purpose of illumination compensation), or parameters specifying the interpolation filter that is employed for deriving the motion compensated prediction signal of the current block. It is assumed that for each sample set, individual coding parameters (e.g., for specifying the prediction and/or residual coding) are transmitted. In order to achieve an improved coding efficiency, this invention presents a method and particular embodiments for merging two or more sample sets into so-called groups of sample sets. All sample sets of such a group share the same coding parameters, which can be transmitted together with one of the sample sets in the group. By doing so, the coding parameters do not need to be transmitted for each sample set of the group of sample sets individually, but instead the coding parameters are transmitted only once for the whole group of sample sets. As a result, the side information rate for transmitting the coding parameters is reduced and the overall coding efficiency is improved. As an alternative approach, an additional refinement for one or more of the coding parameters can be transmitted for one or more of the sample sets of a group of sample sets. The refinement can be either applied to all sample sets of a group or only to the sample set for which it is transmitted.

Figure 6:
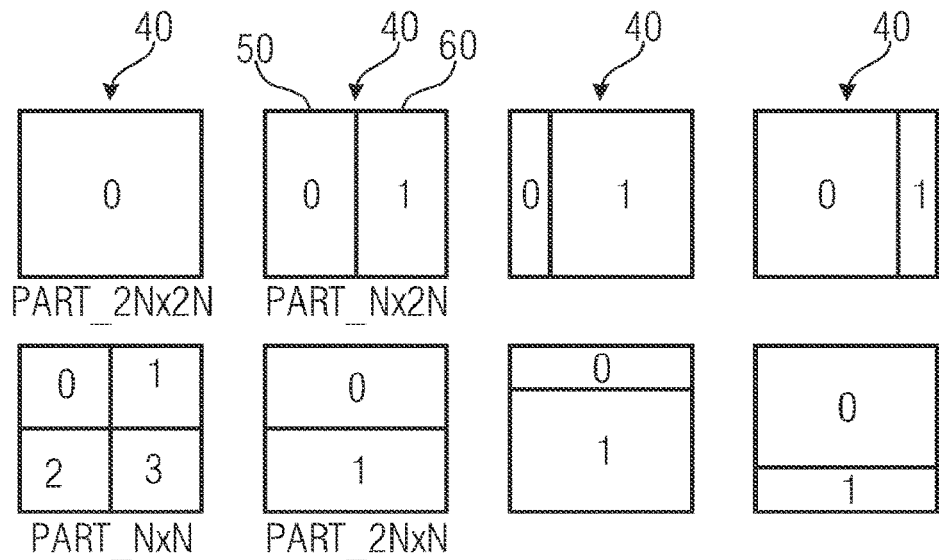
FIG. 6 shows an embodiment for a set of possible supported partitioning patterns in accordance with an embodiment.

Embodiments of the present invention particularly concern the combination of the merging process with a partitioning of a block into various sub-blocks 50, 60 (as mentioned above). Usually, image or video coding systems support various partitioning patterns for a block 40. As an example, a square block can be either not be partitioned or it can be partitioned into four square blocks of the same size, or into two rectangular blocks of the same size (where the square block can be vertically or horizontally divided), or into rectangular blocks of different sizes (horizontally or vertically). The described exemplary partition patterns are illustrated in FIG. 6. In addition to the above description, the partitioning may involve even more than one level of partitioning. For example, the square sub-blocks may optionally also be further partitioned using the same partitioning patterns. The issue that arises when such a partitioning process is combined with a merging process that allows the merging of a (square or rectangular) block with, for example, one of its neighbor blocks is that the same resulting partitioning can be achieved by different combinations of the partitioning patterns and merging signals. Hence, the same information can be transmitted in the bitstream using different codewords, which is clearly sub-optimal with respect to the coding efficiency. As a simple example, we consider a square block that is not further partitioned (as illustrated in the top-left corner of FIG. 6. This partitioning can be directly signaled by sending a syntax element that this block 40 is not subdivided. But, the same pattern can also be signaled by sending a syntax element that specifies that this block is, for example, subdivided into two vertically (or horizontally) aligned rectangular blocks 50, 60. Then we can transmit merging information that specify that the second of these rectangular blocks is merged with the first rectangular block, which results in exactly the same partitioning as when we signal that the block is not further divided. The same can also be achieved by first specifying that the block is subdivided in four square sub-blocks and then transmit merging information that effectively merges all these four blocks. This concept is clearly suboptimal (since we have different codewords for signaling the same thing).

Embodiments of the present invention describe a concept and possibilities for reducing the side information rate and thus increasing the coding efficiency for a combination of the concept of merging with the concept of providing different partitioning patterns for a block. If we look at the example partitioning patterns in FIG. 6, the "simulation" of the not further divided block by any of the partitioning patterns with two rectangular blocks can be avoided when we forbid (i.e., exclude from the bitstream syntax specification) the case that a rectangular block is merged with a first rectangular block. When more deeply looking at the issue, it is also possible to "simulate" the not subdivided pattern by merging the second rectangular with any other neighbor (i.e., not the first rectangular block) that is associated with the same parameters (e.g., information for specifying the prediction) as the first rectangular block. Embodiments of the present invention condition the sending of merging information in a way that the sending of particular merging parameters is excluded from the bitstream syntax when these merging parameters result in a pattern that can also be achieved by signaling one of the supported partitioning patterns. As an example, if the current partitioning pattern specifies the subdivision into two rectangular blocks, as shown in FIGS. 1 and 2, for example, before sending the merging information for the second block, i.e. 60 in case of FIGS. 1 and 2, it can be checked which of the possible merge candidates has the same parameters (e.g., parameters for specifying the prediction signal) as the first rectangular block, i.e. 50 in case of FIGS. 1 and 2. And all candidates that have the same motion parameters (including the first rectangular block itself) are removed from the set of merge candidates. The codewords or flags that are transmitted for signaling the merging information are adapted to the resulting candidate set. If the candidate set becomes empty due to the parameter checking, no merging information is transmitted. If the candidate set consists of just one entry, it is only signaled whether the block is merged or not, but the candidate does not need to be signaled since it can be derived at the decoder side, etc. For the above example, the same concept is also employed to the partitioning pattern that divides a square block into four smaller square blocks. Here, the sending of merging flags is adapted in a way that neither the partitioning pattern that specifies no subdivision nor any of the two partitioning patterns specify a subdivision into two rectangular blocks of the same size can be achieved by a combination of merging flags. Although, we described the concept most on the above example with specific partitioning patterns, it should be clear that the same concept (avoiding the specification of a particular partitioning pattern by a combination of another partitioning pattern and corresponding merging information) can be employed for any other set of partitioning patterns.

Figure 7:
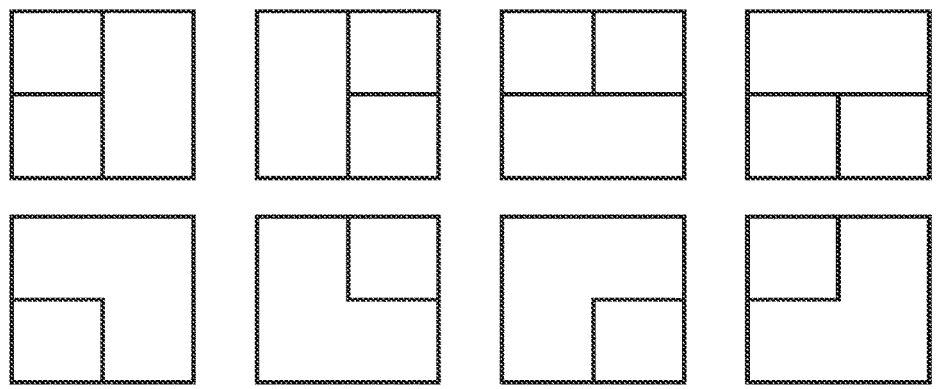
FIG. 7 shows possible partitioning patterns which effectively result from combining block merging and block partitioning when using the block partitioning in accordance with FIG. 6.

The advantage of the described invention with respect to a concept in which only partitioning is allowed is that a much greater freedom is provided for signaling the partitioning of a picture into parts that are associated with the same parameters (e.g., for specifying the prediction signal). As an example, additional partitioning patterns that result from the merging of square blocks that of a subdivided larger block are depicted in FIG. 7. It should, however, be noted that much more resulting patterns can be achieved by the merging with further neighboring blocks (outside of the previously subdivided block). With only a few codewords for signaling the partitioning and merging information, a variety of partitioning possibilities is provided and an encoder can select the best option (for a given encoder complexity) in rate-distortion sense (e.g., by minimizing a particular rate-distortion measure). The advantage compared to an approach in which only one partitioning pattern (e.g., a subdivision into four blocks of the same size) is provided in combination with the merging approach is that often used patterns (as for example rectangular shapes of different sizes) can be signaled by a short codeword instead of several subdivision and merging flags.

Another aspect that needs to be considered is that the merging concept is in some sense similar to the SKIP or DIRECT modes that are found in video coding designs. In SKIP/DIRECT modes, basically no motion parameters are transmitted for a current block, but are inferred from a spatial and/or temporal neighborhood. In a particular efficient concept of the SKIP/DIRECT modes, a list of motion parameter candidates (reference frame indices, displacement vectors, etc.) is created from a spatial and/or temporal neighborhood and an index into this list is transmitted that specifies which of the candidate parameters is chosen. For bi-predicted blocks (or multi-hypothesis frames), a separate candidate can be signaled for each reference list. Possible candidates may include the block to the top of the current block, the block to the left of the current block, the block to the top-left of the current block, the block to the top-right of the current block, the median predictor of various of these candidates, the co-located block in one or more previous reference frames (or any other already coded block, or a combination obtained from already coded blocks). When combining the merge concept with the SKIP/DIRECT mode, it should be ensured that both the SKIP/DIRECT mode and the merge mode should not include the same candidates. This can be achieved by different configurations. It is possible to enable the SKIP/DIRECT mode (e.g. with more candidates than the merge mode) only for particular blocks (e.g. with a size greater than a specified size, or only for square blocks, etc.) and not support the merge mode for these blocks. Or the SKIP/DIRECT mode can be removed and all candidates (including the parameters that represent a combination of parameters for the spatial/temporal neighboring blocks) are added to the merge mode as candidates. This option had also been mentioned above with respect to FIGS. 1-5. The increased candidate set might only be used for particular blocks (with a size larger than a given minimum sizes, or square blocks, etc.), where for other blocks a reduced candidate set is used. Or as a further variant, the merge mode is used with a reduced candidate set (e.g., only the top and left neighbor) and further candidates (e.g., the top-left mode, the co-located block, etc.) are used for the SKIP/DIRECT mode. Also in such configurations, the SKIP/DIRECT modes may only be allowed for particular blocks (with a size larger than a given minimum sizes, or square blocks, etc.), whereas the merge mode is allowed for a larger set of blocks. The advantage of such combinations is that multiple options for signaling the re-usage of already transmitted parameters (e.g., for specifying the prediction) are provided for different block sizes. As an example, for larger square blocks more options are provided, since here the additionally spend bit rate provides an increase in rate-distortion efficiency. For smaller blocks, a smaller set of options is provided. An increase of the candidate set would here not bring any gains in rate-distortion efficiency due to the small ratio of samples per bit necessitated for signaling the selected candidate.

As mentioned above, embodiments of the present invention also provide an encoder with a greater freedom for creating a bitstream, since the merging approach significantly increases the number possibilities for selecting a partitioning for the sample ways of a picture. Since the encoder can choose between more options, e.g., for minimizing a particular rate-distortion measure, the coding efficiency can be improved. As an example, some of the additional patterns that can be represented by a combination of sub-partitioning and merging (e.g., the patterns in FIG. 7) can be additionally tested (using the corresponding block sizes for motion estimation and mode decision) and the best of the patterns provided by purely partitioning (FIG. 6) and by partitioning and merging (FIG. 7) can be selected based on a particular rate-distortion measure. In addition, for each block it can be tested whether a merging with any of the already coded candidate sets yields in decrease of a particular rate-distortion measure and then the corresponding merging flags are set during the encoding process. In summary, there are several possibilities to operate an encoder. In a simple approach, the encoder could first determine the best subdivision of the sample arrays (as in state-of-the-art coding schemes). And then it could check for each sample set, whether a merging with another sample set or another group of sample sets reduces a particular rate-distortion cost measure. At this, the prediction parameters associated with the merged group of sample sets can be re-estimated (e.g., by performing a new motion search) or the prediction parameters that have already be determined for the current sample set and the candidate sample set (or group of sample sets) for merging could be evaluated for the considered group of sample sets. In a more extensive approach, a particular rate-distortion cost measure could be evaluated for additional candidate groups of sample sets. As a particular example, when testing the various possible partitioning patterns (see FIG. 6 for example), some or all of the pattern that can be represented by a combination of partitioning and merging (see FIG. 7 for example) can be additionally tested. I.e., for all of the patterns a specific motion estimation and mode decision process is carried out and the pattern which yields the smallest rate-distortion measure is selected. This process can also be combined with the low complexity process described above, so that for the resulting blocks it is additionally tested whether a merging with already coded blocks (e.g., outside the patterns of FIG. 6 and FIG. 7) yields a decrease in a rate-distortion measure.

In the following, some possible detailed implementation for the embodiments outlined above are described, such as for the encoders in FIGS. 1 and 3 and the decoders of FIGS. 2 and 4. As already noted above, same are usable in image and video coding. As described above, the pictures or particular sets of sample arrays for the pictures may be decomposed into blocks, which are associated with particular coding parameters. The pictures usually consist of multiple sample arrays. In addition, a picture may also be associated with additional auxiliary samples arrays, which may, for example, specify transparency information or depth maps. The sample arrays of a picture (including auxiliary sample arrays) can be grouped into one or more so-called plane groups, where each plane group consists of one or more sample arrays. The plane groups of a picture can be coded independently or, if the picture is associated with more than one plane group, with prediction from other plane groups of the same picture. Each plane group is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated with coding parameters, e.g. for the purpose of prediction. An example of possible partitioning patterns is shown in FIG. 6. For all samples of a block (or the corresponding blocks of sample arrays), the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is build by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. In the above example for FIGS. 1-5, it has been noted that it is possible that the leaf nodes of the first subdivision, i.e. the coding blocks 40, may parallely be further partitioned into the partition defining the granularity of coding parameters, on the one hand, and the transform blocks onto which the two-dimensional transform is applied individually, on the other hand. After transform, the resulting transform coefficients are quantized and so-called transform coefficient levels are obtained. The transform coefficient levels as well as the prediction parameters and, if present, the subdivision information is entropy coded.

In state-of-the-art image and video coding standards, the possibilities for subdividing a picture (or a plane group) into blocks that are provided by the syntax are very limited. Usually, it can only be specified whether and (potentially how) a block of a predefined size can be subdivided into smaller blocks. As an example, the largest block size in H.264 is 16×16. The 16×16 blocks are also referred to as macroblocks and each picture is partitioned into macroblocks in a first step. For each 16×16 macroblock, it can be signaled whether it is coded as 16×16 block, or as two 16×8 blocks, or as two 8×16 blocks, or as four 8×8 blocks. If a 16×16 block is subdivided into four 8×8 block, each of these 8×8 blocks can be either coded as one 8×8 block, or as two 8×4 blocks, or as two 4×8 blocks, or as four 4×4 blocks. The small set of possibilities for specifying the partitioning into blocks in state-of-the-art image and video coding standards has the advantage that the side information rate for signaling the subdivision information can be kept small, but it has the disadvantage that the bit rate necessitated for transmitting the prediction parameters for the blocks can become significant as explained in the following. The side information rate for signaling the prediction information does usually represent a significant amount of the overall bit rate for a block. And the coding efficiency could be increased when this side information is reduced, which, for instance, could be achieved by using larger block sizes. It is also possible to increase the set of supported partitioning patterns in comparison to H.264. For example, the partitioning patterns depicted in FIG. 6 can be provided for square blocks of all sizes (or selected sizes). Real images or pictures of a video sequence consist of arbitrarily shaped objects with specific properties. As an example, such objects or parts of the objects are characterized by a unique texture or a unique motion. And usually, the same set of prediction parameters can be applied for such an object or part of an object. But the object boundaries usually don't coincide with the possible block boundaries for large prediction blocks (e.g., 16×16 macroblocks in H.264). An encoder usually determines the subdivision (among the limited set of possibilities) that results in the minimum of a particular rate-distortion cost measure. For arbitrarily shaped objects, this can result in a large number of small blocks. This statement remains also true when more partitioning patterns (as mentioned) above are provided. It should be noted that the amount of partitioning patterns should not become too large, since then a lot of side information and/or encoder/decoder complexity is necessitated for signaling and processing these patterns. So, arbitrarily shaped objects often result in a large number of small blocks due to the partitioning. And since each of these small blocks is associated with a set of prediction parameters, which need to be transmitted, the side information rate can become a significant part of the overall bit rate. But since several of the small blocks still represent areas of the same object or part of an object, the prediction parameters for a number of the obtained blocks are the same or very similar. Intuitively, the coding efficiency could be increased when the syntax is extended in a way that it does not only allow to subdivide a block, but also to merge two or more of the blocks that are obtained after subdivision. As a result, one would obtain a group of blocks that are coded with the same prediction parameters. The prediction parameters for such a group of blocks need to be coded only once. In the above examples of FIGS. 1-5, for example, the coding parameters for the current clock 40 are not transmitted provided that merging takes place, i.e. the reduced set of candidates does not vanish. That is, the encoder does not transmit the coding parameters associated with the current block, and the decoder does not expect the bitstream 30 to contain coding parameters for the current block 40. Rather, in accordance with its specific embodiments, merely refinement information may be conveyed for the merged current block 40. As a determination of a candidate set and the reduction thereof as well as the merging and so forth is also performed for the other coding blocks 40 of picture 20. The coding blocks somehow form groups of coding blocks along a coding chain, wherein the coding parameters for these groups are transmitted within the bitstream in full merely once.

If the bit rate that is saved by reducing the number of coded prediction parameters is larger than the bit rate that is additionally spend for coding the merging information, the described merging does result in increased coding efficiency. It should further be mentioned that the described syntax extension (for the merging) provides the encoder with additional freedom in selecting the partitioning of a picture or plane group into blocks. The encoder is not restricted to do the subdivision first and then to check whether some of the resulting blocks have the same set of prediction parameters. As one simple alternative, the encoder could first determine the subdivision as in state-of-the-art coding techniques. And then it could check for each block, whether a merging with one of its neighbor blocks (or the associated already determined group of blocks) reduces a rate-distortion cost measure. At this, the prediction parameters associated with the new group of blocks can be re-estimated (e.g., by performing a new motion search) or the prediction parameters that have already been determined for the current block and the neighboring block or group of blocks could be evaluated for the new group of blocks. An encoder can also directly check (a subset of) the patterns that are provided by a combination of splitting and merging; i.e., the motion estimation and mode decision can be done with the resulting shapes as already mentioned above. The merging information can be signaled on a block basis. Effectively, the merging could also be interpreted as inference of the prediction parameters for a current block, where the inferred prediction parameters are set equal to the prediction parameters of one of the neighboring blocks.

At this, it should be noted that the combination of different partitioning patterns and merging information can result in the same shapes (which are associated with the same parameters). This is clearly suboptimal, since the same message can be transmitted with different combinations of codewords. In order to avoid (or reduce) this drawback, the embodiments of the present invention describe a concept, which prohibits that the same shape (associated with a particular set of parameters) can be signaled by different partitioning and merging syntax elements. Therefore, for all blocks of a previously subdivided block—except the first in coding order—it is checked in encoders and decoders such as 10 and 50, for all merging candidates whether a merging would result of a pattern that could be signaled by a partitioning without merging information. All candidate blocks for which this is true are removed from the set of merging candidates and the transmitted merging information is adapted to the resulting candidate set. If no candidate remains, no merging information is transmitted; if one candidate remains only, a flag which specifies whether the block is merged or not is transmitted, etc. For further illustration of this concept, an embodiment is described below. The advantage of the described embodiments with respect to a concept in which only partitioning is allowed is that a much greater freedom is provided for signaling the partitioning of a picture into parts that are associated with the same parameters (e.g., for specifying the prediction signal). The advantage compared to an approach in which only one partitioning pattern (e.g., a subdivision into four blocks of the same size) is provided in combination with the merging approach is that often used patterns (as for example rectangular shapes of different sizes) can be signaled by a short codeword instead of several subdivision and merging flags.

State-of-the-art video coding standards as H.264 also contain particular inter code modes called SKIP and DIRECT mode, in which the parameters specifying the prediction are completely inferred from spatially and/or temporally neighboring blocks. The difference between SKIP and DIRECT is that the SKIP mode further signals that no residual signal is transmitted. In various proposed improvements of the SKIP/DIRECT mode, instead of a single candidate (as in H.264), a list of possible candidates is inferred from a spatial and/or temporal neighborhood of the current block. Possible candidates may include the block to the top of the current block, the block to the left of the current block, the block to the top-left of the current block, the block to the top-right of the current block, the median predictor of various of these candidates, the co-located block in one or more previous reference frames (or any other already coded block, or a combination obtained from already coded blocks). For a combination with the merge mode, it should be ensured that both the SKIP/DIRECT mode and the merge mode should not include the same candidates. This can be achieved by different configurations as mentioned above. The advantage of the described combinations is that multiple options for signaling the re-usage of already transmitted parameters (e.g., for specifying the prediction) are provided for different block sizes.

One advantage of the embodiments of the present invention is to reduce the bit rate that is necessitated for transmitting the prediction parameters by merging neighboring blocks into a group of blocks, where each group of blocks is associated with a unique set of coding parameters, e.g. prediction parameters or residual coding parameters. The merging information is signaled inside the bitstream (in addition to the subdivision information, if present). In combination with different splitting patterns and SKIP/DIRECT modes it may be ensured that the SKIP/DIRECT mode and none of the provided patterns is "simulated" by sending corresponding merging information. The advantage of the embodiments of the present invention is an increased coding efficiency resulting from a decreased side information rate for the coding parameters. The embodiments of the present invention are applicable in image and video coding applications, in which sets of samples are associated with particular coding or prediction parameters. The merging process presently described also extends to a third dimension or more dimensions. For example, a group of blocks in several video pictures could be merged into one group of blocks. It could also be applied to 4D compression in light-field coding. On the other hand, it can also be used for compression in 1D signals, where the 1D signal is partitioned and given partitions are merged.

The embodiments of the present invention also relate to a method for reducing the side information rate in image and video coding applications. In image and video coding applications, particular sets of samples (which may represent rectangular or quadratic blocks or arbitrarily shaped regions or any other collection of samples) are usually associated with a particular set of coding parameters. For each of these sample sets, the coding parameters are included in the bitstream. The coding parameters may represent prediction parameters, which specify how the corresponding set of samples is predicted using already coded samples. The partitioning of the sample arrays of a picture into sample sets may be fixed by the syntax or may be signaled by corresponding subdivision information inside the bitstream. Multiple partitioning patterns for a block may be allowed. The coding parameters for the sample sets are transmitted in a predefined order, which is given by the syntax. The embodiments of the present invention also represent a method by which it can be signaled for a current set of samples that it is merged (e.g., for the purpose of prediction) with one or more other sample sets into a group of sample sets. Therefore, the possible set of values for the corresponding merging information is adapted to the employed partitioning pattern, in a way that particular partitioning patterns cannot be represented by a combination of other partitioning patterns and corresponding merging data. The coding parameters for a group of sample sets need to be transmitted only once. In a particular embodiment, the coding parameters of a current sample set are not transmitted if the current sample set is merged with a sample set (or a group of sample sets) for which the coding parameters have already been transmitted; instead, the coding parameters for the current set of samples are set equal to the coding parameters of the sample set (or group of sample sets) with which the current set of samples is merged. As an alternative approach, an additional refinement for one or more of the coding parameters can be transmitted for a current sample set; the refinement can be either applied to all sample sets of a group or only to the sample set for which it is transmitted.

In an embodiment, for each set of samples, the set of all previously coded sample sets is called the "set of causal sample sets". The sets of samples that can be used for the merging with a current set of samples is called the "set of candidate sample sets" and is a subset of the "set of causal sample sets". The way how this subset is formed can either be known to the decoder or it can be specified inside the bitstream. In any case, encoder 10 and decoder 80 determine the candidate set to be reduced. If a particular current set of samples is coded and its set of candidate sample sets is not empty, it is signaled (or derived) whether the current set of samples is merged with one sample set out of this set of candidate sample sets and if so, with which of them (if more than one candidates exist). Otherwise, the merging cannot be used for this block. Candidate blocks for which a merging would result in a shape that could also directly be specified by a partitioning pattern are excluded from the candidate set, in order to avoid that the same shape can be represented by different combinations of partitioning information and merging data. That is, the candidate set is reduced, by removal of respective candidates as described above with respect to FIGS. 1-5.

In an embodiment, a number of the set of candidate sample sets is zero or more sample sets that contain at least a particular non-zero number of samples (which may be one, two, or even more) that represent direct spatial neighbors of any sample inside the current set of samples. In another embodiment of the invention, the set of candidate sample sets may additionally (or exclusively) include sets of samples that contain a particular non-zero number of samples (which may be one or two or even more) that have the same spatial location, i.e. are comprised by both the candidate sample sets and the current sample set currently subject of merging—but are contained in a different picture. In another embodiment of the invention, the set of candidate sample sets may be derived from previously processed data within the current picture or in other pictures. The derivation method may include spatial directional information such as transform coefficients, associated with a particular direction and image gradients of the current picture or it may include temporal directional information such as neighboring motion representations. From such data available at the receiver and other data and side information (if present), the set of candidate sample sets may be derived. The removal of candidates (from the original candidate set) that would result in the same shape as could be represented by a particular partitioning pattern is derived in the same way at encoder and decoder, so that encoder and decoder derive the final candidate set for merging in exactly the same way.

In an embodiment, the considered sets of samples are rectangular or quadratic blocks. Then, the merged sets of samples represent a collection of rectangular and/or quadratic blocks. In another embodiment of the invention, the considered sets of samples are arbitrarily shaped picture regions and the merged sets of samples represent a collection of arbitrarily shaped picture regions.

In an embodiment, one or more syntax elements are transmitted for each set of samples, which specify whether the set of samples is merged with another sample set (which may be part of an already merged group of sample sets) and which of the set of candidate sample sets is employed for merging. The syntax element is however not transmitted if the candidate set is empty (e.g. due to a removal of the candidates that would produce a partitioning that could be signaled by different partitioning pattern without merging).

In an embodiment, one or two syntax elements are transmitted for specifying the merging information. The first syntax element specifies whether the current set of samples is merged with another sample set. The second syntax element, which is only transmitted if the first syntax element specifies that the current set of samples is merged with another set of samples, specifies which of the sets of candidate sample sets is employed for merging. In an embodiment, the first syntax element is only transmitted if a derived set of candidate sample sets is not empty (after the potential removal of the candidates that would produce a partitioning that could be signaled by different partitioning pattern without merging). In another embodiment, the second syntax element is only transmitted if a derived set of candidate sample sets contains more than one sample set. In a further embodiment of the invention, the second syntax element is only transmitted if at least two sample sets of a derived set of candidate sample sets are associated with different coding parameters.

In an embodiment of the invention, the merging information for a set of samples is coded before the prediction parameters (or, more generally, the particular coding parameters that are associated with the sample sets). The prediction or coding parameters are only transmitted if the merging information signals that the current set of samples is not merged with another set of samples.

In another embodiment, the merging information for a set of samples is coded after a subset of the prediction parameters (or, more generally, the particular coding parameters that are associated with the sample sets) has been transmitted. The subset of prediction parameters may consist of one or more reference picture indices or one or more components of a motion parameter vector or a reference index and one or more components of a motion parameter vector, etc. The already transmitted subset of prediction or coding parameters can be used for deriving a (reduced) set of candidate sample sets. As an example, a difference measure between the already coded prediction or coding parameters and the corresponding prediction or coding parameters of an original set of candidate sample sets can be calculated. And only those sample sets, for which the calculated difference measure is smaller than or equal to a predefined or derived threshold, are included in the final (reduced) set of candidate sample sets. The threshold may be derived based on the calculated difference measures. Or as another example, only those sets of samples are selected for which the difference measure is minimized. Or only one set of samples is selected based on the difference measure. In the latter case, the merging information can be reduced in a way that it only specifies whether the current set of samples is merged with the single candidate set of samples.

The following embodiments are described for sets of samples that represent rectangular and quadratic blocks, but it can be extended to arbitrarily shaped regions or other collections of samples in a straightforward way.

1. Derivation of the Initial Set of Candidate Blocks

The derivation of the initial set of samples described in this sections concerns the derivation of an initial candidate set. Some of all of the candidate blocks may be later removed by analyzing the associated parameters (e.g. prediction information) and removal of those candidate blocks for which a merging would result in a final partitioning that could also be obtained by using another partitioning patterns. This process is described in the next subsection.

In an embodiment, the set of initial candidate blocks is formed as follows. Starting from the top-left sample position of the current block, it's left neighboring sample position and its top neighboring sample position is derived. The set of initial candidate blocks can have only up to two elements, namely those blocks out of the set of causal blocks that contain one of the two sample positions. Thus, the set of initial candidate blocks can only have the two directly neighboring blocks of the top-left sample position of the current block as its elements.

In another embodiment of the invention, the set of initial candidate blocks is given by all blocks that have been coded before the current block and contain one or more samples that represent direct spatial neighbors (the direct spatial neighbors may be restricted to direct left neighbors and/or direct top neighbors and/or direct right neighbors and/or direct bottom neighbors) of any sample of the current block. In another embodiment of the invention, the set of initial candidate blocks does additionally (or exclusively) include blocks that contain one or more samples that are located at the same position as any of the samples of the current block but are contained in a different (already coded) picture. In another embodiment of the invention, the initial candidate set of blocks represents a subset of the above described sets of (neighboring) blocks. The subset of candidate blocks may be fixed, signaled or derived. The derivation of the subset of candidate blocks may consider decisions made for other blocks in the picture or in other pictures. As an example, blocks that are associated with the same (or very similar) coding parameters than other candidate blocks might not be included in the initial candidate set of blocks.

In an embodiment of the invention, the set of initial candidate blocks is derived as for one of the embodiments described above, but with the following restriction: Only blocks using motion-compensated prediction (inter prediction) can be elements of the set of candidate blocks. I.e., intra-coded blocks are not included in the (initial) candidate set.

As has already been stated above, it is possible to extend the list of candidates by extra candidates for block merging such as by combined bi-predictive merging candidates, non-scaled bi-predictive merging candidates and a zero motion vector.

The derivation of the initial set of candidate blocks is performed by both, encoder and decoder in the same way.

2. Derivation of the Final Set of Candidate Blocks.

After deriving the initial candidate set, the associated parameters of the candidate blocks inside the initial candidate set are analyzed and merging candidates for which a merging would result in a partitioning that could be represented by using a different partitioning pattern are removed. If the sample arrays that can be merged are of different shape and or size, there may exist identical partitionings that can be described by at least two different codewords. For example if the encoder decides to split a sample array into two sample arrays, this splitting would be reversed by merging the two sample arrays. To avoid such redundant descriptions, the set of candidate blocks for merging is constrained depending on the particular block shapes and splittings that are allowed. On the other hand, the allowed shapes of sample arrays can be constrained depending on the particular candidate lists used for merging. The two facilities of splitting and merging have to be designed together so that in combination of the two, redundant descriptions are avoided.

In an embodiment of the invention, the set of splitting modes (or partitioning modes) depicted in FIG. 6 are supported for square blocks. If a square block of a particular size is split into four smaller square blocks of the same size (bottom-left pattern in FIG. 6), the same set of partitioning patterns can be applied to the resulting four square blocks so that a hierarchical partitioning can be specified.

After deriving the set of initial candidate blocks, the reduction of the candidate lists is done as follows.

If the current block is not further partitioned (top-left pattern in FIG. 6), the initial candidate list is not reduced. I.e., all initial candidates represent the final candidates for merging.

If the current block is partitioned into exactly two blocks of arbitrary size, one of these two blocks is coded before the other, which is determined by the syntax. For the first coded block, the initial candidate set is not reduced. But for the second coded block, all candidate blocks that have the same associated parameters as the first block are removed from the candidate set (this includes the first coded block).

If a block is partitioned into four square blocks of the same size, the initial candidate list of the first three blocks (in coding order) is not reduced. All blocks of the initial candidate list are also present in the final candidate list. But for the fourth (last) block in coding order, the following applies:

If the blocks that are in a different row (in the partitioning scheme as illustrated in the bottom-left of FIG. 6) than the current block have the same associated parameters (e.g., motion parameters), all candidates that have the same motion parameters as the already coded block in the same row as the current block are removed from the candidate set (this includes the block in the same row).

If the blocks that are in a different column (in the partitioning scheme as illustrated in the bottom-left of FIG. 6) than the current block have the same associated parameters (e.g., motion parameters), all candidates that have the same motion parameters as the already coded block in the same column as the current block are removed from the candidate set. (this includes the block in the same column)

In a low-complexity variation of the embodiment (using the partitioning patterns of FIG. 6), the reduction of the candidate lists is done as follows.

If the current block is not further partitioned (top-left pattern in FIG. 6), the initial candidate list is not reduced. I.e., all initial candidates represent the final candidates for merging.

If the current block is partitioned into exactly two blocks of arbitrary size, one of these two blocks is coded before the other, which is determined by the syntax. For the first coded block, the initial candidate set is not reduced. But for the second coded block, the first coded block of the partitioning pattern is removed from the candidate set.

If a block is partitioned into four square blocks of the same size, the initial candidate list of the first three blocks (in coding order) is not reduced. All blocks of the initial candidate list are also present in the final candidate list. But for the fourth (last) block in coding order, the following applies:

If for the block in the other row (than the current block) that is coded later, the merging information signals that it is merged with the first coded block of that row, the block in the same row as the current block is removed from the candidate set.

If for the block in the other column (than the current block) that is coded later, the merging information signals that it is merged with the first coded block of that column, the block in the same column as the current block is removed from the candidate set.

In another embodiment, the same partitioning patterns as depicted in FIG. 6 are supported, but without the patterns that partition the square block into two rectangular blocks of the same size. The reduction of the candidate list proceeds as described by any of the embodiments described above, with exception of the pattern that splits the block into four square blocks. Here, either all initial candidates are allowed for all subblocks or only the candidate list of the last coded subblock is constrained as follows. If the previously coded three blocks are associated with the same parameters, all candidates that are associated with these parameters are removed from the candidate list. In a low-complexity version, the last coded subblock cannot be merged with any of the three previously coded subblocks if these three subblocks have been merged together.

In another embodiment, a different set of partitioning patterns for a block (or any other form of sample array set) is supported. For sample array sets that are not partitioned, all candidates of the initial candidate lists can be used for the merging. If a sample array is partitioned into exactly two sample arrays, for the sample arrays that is first in coding order all candidates of the initial candidate set are inserted into the final candidate set. For the second sample array in coding order, all candidates that have the same associated parameters as the first sample array are removed. Or in a low-complexity variation, only the first sample array is removed from the candidate set. For partitioning patterns that split a sample array into more than 2 sample arrays, the removal of candidates depends on whether another partitioning pattern can be simulated with the current partition pattern and corresponding merging information. The process of candidate removal follows the concept explicitly described above, but considers the actually supported candidate patterns.

In a further embodiment, if the SKIP/DIRECT mode is supported for a particular block, the merging candidates that are also present candidates for the SKIP/DIRECT modes are removed from the candidate list. This removal can replace the removals of candidate blocks described above or used together with the removals of candidate blocks described above.

3. Combination with SKIP/DIRECT Modes

The SKIP/DIRECT modes may be supported for all or only a particular block sizes and/or block shapes. A set of candidate blocks is used for the SKIP/DIRECT modes. The difference between SKIP and DIRECT is whether residual information is sent or not. The parameters (e.g., for prediction) of SKIP and DIRECT are inferred to be equal to any of the corresponding candidates. The candidate is chosen by transmitting an index into the candidate list.

Figure 8:
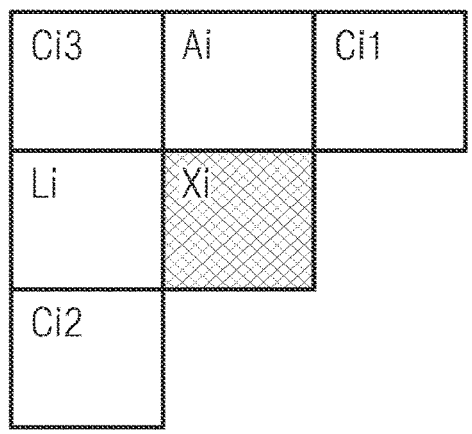
FIG. 8 schematically shows candidate blocks for a SKIP/DIRECT mode in accordance with an embodiment.

In an embodiment, the candidate list for SKIP/DIRECT may contain different candidates. An example is illustrated in FIG. 8. The candidate list may include the following candidates (the current block is denoted by Xi):

Median (between Left, Above. Corner)
Left block (Li)
Above block (Ai)
Corner blocks (In order: Above Right (Ci1), Below Left (Ci2), Above Left (Ci3))
Collocated block in a different, but already coded picture In an embodiment, the candidates for merging include Li (Left block) and Ai (Above block). Choosing these candidates for merging necessitates a small amount of side information for signaling with which block the current block is merged.

The following notation is used for describing following embodiments:

set_mvp_ori is a set of candidates used for the SKIP/DIRECT mode. This set is composed of {Median, Left, Above, Corner, Collocated}, where Median is the median (middle value in an ordered set of Left, Above and Corner), and collocated is given by the nearest reference frame and is scaled according to temporal distance.

set_mvp_comb is a set of candidates used for the SKIP/DIRECT mode in combination with the block merging process.

For the embodiment, the combination between SKIP/DIRECT mode and block merging mode can be processed with the original set of candidates. This means that the SKIP/DIRECT mode has the same set of candidates as when it is activated alone. The interest of combining this two modes comes from their complementarity in signaling the side information in inter frame. Despite the fact that both of these modes are using information of the neighbors in order to improve the signalization of the current block, the block merging is processing only the left and the above neighbors and SKIP/DIRECT mode is processing up to 5 candidates. The main complementarily resides in the different approach of processing the neighbor information. The block merging process keeps the complete set of information of its neighbors for all the reference lists. This means that block merging keeps the complete side information from these neighbors and not only its motion vectors per reference list, whereas the SKIP/DIRECT mode separately processes the prediction parameters for each reference lists and transmit an index into a candidate list for each reference list. I.e., for bi-predicted pictures, two indexes are transmitted for signaling a candidate for reference list 0 and a candidate for reference list 1.

In another embodiment, a combined set of candidates, called set_mvp_comb, can be found for the SKIP/DIRECT mode in combination with the block merging mode. This combined set is a part of the original set (set_mvp_ori) and allows a reduction of signalization for the SKIP/DIRECT mode, because of the reduction of the list of candidates: set_mvp_comb. The candidates which should be removed from the original list (set_mvp_ori) are these which could be redundant with the block merging process or are not often used.

In another embodiment, the combination between SKIP/DIRECT mode and block merging process can be processed with the combined set of candidates (set_mvp_comb), which is the original set (set_mvp_ori) without the Median. Because of a low efficiency observed for the Median for the SKIP/DIRECT mode, its reduction of the original list, brings an improvement in coding efficiency.

In another embodiment, the combination of the SKIP/DIRECT mode and block merging can be processed with the combined set of candidates (set_mvp_comb), which is the original set (set_mvp_ori) only with the Corner and/or with the Collocated as candidates.

In another embodiment, the combination of the SKIP/DIRECT mode and block merging process can be processed with the combined set of candidates, which is the set_mvp_ori with only the Corner and the Collocated as candidates. Despite the complimentarily between the SKIP/DIRECT mode and block merging, as already mentioned, the candidates which should be removed from the list are these which could be redundant with the candidates of the block merging process. These candidates are Left and Above. The combined set of candidates (set_mvp_comb) has been reduced to only two candidates: Corner and Collocated. The SKIP/DIRECT mode using this candidate set set_mvp_comb, combined with the block merging process gives a high increase in efficiency of signaling the side information in inter frames. In this embodiment, the SKIP/DIRECT mode and the merging mode do not share any candidate block.

In further embodiments, slightly different combination of the SKIP/DIRECT and merge mode can be used. It is possible to enable the SKIP/DIRECT mode (e.g. with more candidates than the merge mode) only for particular blocks (e.g. with a size greater than a specified size, or only for square blocks, etc.) and not support the merge mode for these blocks. Or the SKIP/DIRECT mode can be removed and all candidates (including the parameters that represent a combination of parameters for the spatial/temporal neighboring blocks) are added to the merge mode as candidates. This option has been described in FIGS. 1 to 5. The increased candidate set might only be used for particular blocks (with a size larger than a given minimum sizes, or square blocks, etc.), where for other blocks a reduced candidate set is used. Or as a further variant, the merge mode is used with a reduced candidate set (e.g., only the top and left neighbor) and further candidates (e.g., the top-left neighbor, the co-located block, etc.) are used for the SKIP/DIRECT mode. Also in such configurations, the SKIP/DIRECT modes may only be allowed for particular blocks (with a size larger than a given minimum sizes, or square blocks, etc.), whereas the merge mode is allowed for a larger set of blocks.

4. Transmission of Merging Information

For the embodiment and, in particular, for embodiments of FIGS. 1 to 5, the following may apply. Imagine, only the two blocks that contain the left and top neighbor sample of the top-left sample of the current blocks are considered as candidates. If the set of final candidate blocks (after removal of candidates as described above) is not empty, one flag called merge_flag is signaled, specifying whether the current block is merged with any of the candidate blocks. If the merge_flag is equal to 0 (for "false"), this block is not merged with one of its candidate blocks and all coding parameters are transmitted ordinarily. If the merge_flag is equal to 1 (for "true"), the following applies. If the set of candidate blocks contains one and only one block, this candidate block is used for merging. Otherwise, the set of candidate blocks contains exactly two blocks. If the prediction parameters of these two blocks are identical, these prediction parameters are used for the current block. Otherwise (the two blocks have different prediction parameters), a flag called merge_left_flag is signaled. If merge_left_flag is equal to 1 (for "true"), the block containing the left neighboring sample position of the top-left sample position of the current block is selected out of the set of candidate blocks. If merge_left_flag is equal to 0 (for "false"), the other (i.e., top neighboring) block out of the set of candidate blocks is selected. The prediction parameters of the selected block are used for the current block. In another embodiment, a combined syntax element is transmitted that signals the merging process. In another embodiment, the merge_left_flag is transmitted regardless of whether the two candidate blocks have the same prediction parameters.

It should be noted that the syntax element merge_left_flag could also be named merge_index, as its function is to index the chosen one among the non-removed candidates.

In another embodiment, more than two blocks may be included in the set of candidate blocks. The merging information (i.e., whether a block is merged and, if yes, with which candidate block it is merged) is signaled by one or more syntax elements. At this, the set of codewords depends on the number of candidates in the final candidate set and is selected in the same way at encoder and decoder. In one embodiment, the merging information is transmitted using one syntax element. In another embodiment, one syntax element specifies whether the block is merged with any of the candidate blocks (cp. the merge_flag described above). This flag is only transmitted, if the set of candidate blocks is not empty. The second syntax element signals which of the candidate blocks is employed for merging; it is only transmitted if the fast syntax element signals that the current block is merged with one of the candidate blocks. In an embodiment of the invention, the second syntax element is only transmitted if the set of candidate blocks contains more than one candidate block and/or if any of the candidate blocks has different prediction parameters than any other of the candidate blocks. The syntax can be depending on how many candidate blocks are given and/or on how different prediction parameters are associated with the candidate blocks.

It is possible to add a set of candidates for block merging as it was done for DIRECT mode.

As described in other embodiments, the second syntax element merge index may only be transmitted if the list of candidates contains more than one candidate. This necessitates deriving the list prior to parsing merge index, preventing to carry out these two processes in parallel. To allow for an increased parsing throughput and to make the parsing process more robust with regard to transmission errors, it is possible to remove this dependency by using a fixed codeword for each index value and a fixed number of candidates. If this number may not be reached by a candidate selection, it is possible to derive ancillary candidates to complete the list. These additional candidates may include so-called combined candidates, which are built from motion parameters of possibly different candidates already in the list, and zero motion vectors.

In another embodiment, the syntax for signaling which of the blocks of the candidate set is simultaneously adapted at encoder and decoder. If for example, 3 choices of blocks for merging are given, those three choices are only present in the syntax and are considered for entropy coding. The probabilities for all other choices are considered to be 0 and the entropy codec is adjusted simultaneously at encoder and decoder.

The prediction parameters that are inferred as a consequence of the merging process may represent the complete set of the prediction parameters that are associated with a block or they may represent of subset of these prediction parameters (e.g., the prediction parameters for one hypothesis of a block for which multi-hypotheses prediction is used).

In an embodiment, the syntax elements related to the merging information are entropy coded using context modeling. The syntax elements may consist of the merge_flag and merge_left_flag described above.

In one embodiment, one out of three context models is used for coding the merge_flag. The used context model merge_flag_ctx is derived as follows. If the set of candidate blocks contains two elements, the value of merge_flag_ctx is equal to the sum of the values of the merge_flag of the two candidate blocks. If the set of candidate blocks contains one element, the value of merge_flag_ctx is equal to two times the value of merge_flag of this one candidate block.

In an embodiment, the merge_left_flag is coded using a single probability model.

Different context models coding for merge_idx (merge_left_flag) may be used.

In other embodiments, different context models might be used. Non-binary syntax elements may be mapped onto a sequence of binary symbols (bins). The context models for some syntax elements or bins of syntax elements may be derived based on already transmitted syntax elements of neighboring blocks or the number of candidate blocks or other measures, while other syntax elements or bins of syntax elements may be coded with a fixed context model.

5. Encoder Operation

The inclusion of the merging concept provides an encoder with a greater freedom for the creation of a bitstream, since the merging approach significantly increases the number of possibilities for selecting a partitioning for the sample arrays of a picture, at, of course, increased signalization overhead. Some or all of the additional patterns that can be represented by a combination of sub-partitioning and merging (e.g., the patterns in FIG. 7, when the partitioning pattern of FIG. 6 are supported) can be additionally tested (using the corresponding block sizes for motion estimation and mode decision) and the best of the patterns provided by purely partitioning (FIG. 6) and by partitioning and merging (FIG. 7) can be selected based on a particular rate-distortion measure. In addition, for each block it can be tested whether a merging with any of the already coded candidate sets yields in decrease of a particular rate-distortion measure and then the corresponding merging flags are set during the encoding process.

In another embodiment, the encoder could first determine the best subdivision of the sample arrays (as in state-of-the-art coding schemes). And then it could check for each sample set, whether a merging with another sample set or another group of sample sets reduces a particular rate-distortion cost measure. At this, the prediction parameters associated with the merged group of sample sets can be re-estimated (e.g., by performing a new motion search) or the prediction parameters that have already been determined for the current sample set and the candidate sample set (or group of sample sets) for merging could be evaluated for the considered group of sample sets.

In another embodiment, particular rate-distortion cost measure could be evaluated for additional candidate groups of sample sets. As a particular example, when testing the various possible partitioning patterns (see FIG. 6, for example), some or all of the pattern that can be represented by a combination of partitioning and merging (see FIG. 7, for example) can be additionally tested. I.e., for all of the patterns a specific motion estimation and mode decision process is carried out and the pattern which yields the smallest rate-distortion measure is selected. This process can also be combined with the low complexity process described above, so that for the resulting blocks it is additionally tested whether a merging with already coded blocks (e.g., outside the patterns of FIG. 6 and FIG. 7) yields a decrease in a rate-distortion measure.

In another embodiment, the encoder tests the different patterns that can be represented by partitioning and merging in a priority order and it tests as many patterns as possible by given real-time requirement. The priority order can also be modified based on the already coded blocks and chosen partitioning patterns.

One way of transferring the above-outlined embodiments to a specific syntax is explained in the following with respect to the following figures. In particular, FIGS. 9, 10, 11A, and 11B show different portions of a syntax which takes advantage of the above-outlined embodiments. In particular, in accordance with the below-outlined embodiment, picture 20 is firstly up-divided into coding tree blocks the picture content of which is coded using the syntax coding_tree shown in FIG. 9. As shown therein, for entropy_coding_mode_flag=1, which relates to, for example, context adaptive binary arithmetic coding or another specific entropy coding mode, the quad-tree subdivision of the current coding tree block is signaled within syntax portion coding_tree by way of the flags called split_coding_unit_flag at mark 400. As shown in FIG. 9, in accordance with the embodiment described hereinafter, the tree-root block is subdivided as signaled by split_coding_unit_flag in a depth-first traversal order as shown in FIG. 9a. Whenever a leaf node is reached, same represents a coding unit, which is coded right away using the syntax function coding_unit. This can be seen from FIG. 9 when looking at the if-clause at 402 which checks as to whether the current split_coding_unit_flag is set or not. If yes, function coding_tree is recursively called, leading to a further transmission/extraction of a further split_coding_unit_flag at the encoder and decoder, respectively. If not, i.e. if the split_coding_unit_flag=0, the current sub-block of the tree-root block 200 of FIG. 5A is a leaf block and in order to code this coding unit, the function coding_unit of FIG. 10 is called at 404.

In the currently described embodiment, the above-mentioned option is used according to which merging is merely usable for pictures for which the inter prediction mode is available. That is, intra-coded slices/pictures do not use merging anyway. This is visible from FIG. 10, where the flag merge_flag is transmitted at 406 merely in case of a slice type being unequal to the intra-picture slice type. Merging relates, in accordance with the present embodiment, merely to the prediction parameters related to inter prediction. In accordance with the present embodiment, the merge_flag is signaled for the whole coding unit 40 and also signals to the decoder a certain partitioning mode for the current coding unit, namely the no partitioning mode. Accordingly, the function prediction_unit is called at 408 with denoting the current coding unit as being a prediction unit. This is, however, not the only possibility for switching on the merging option. Rather, if the merge_flag related to the whole coding unit is not set at 406, the prediction type of the coding unit of the non-intra-picture slice is signaled at 410 by syntax element pred_type with, depending thereon, calling function prediction_unit for any partition of the current coding unit at, for example, 412 in case of the current coding unit being not further partitioned. In FIG. 10, merely four different partitioning options are shown, but the other partitioning options shown in FIG. 6 may be available as well. Another possibility would be that the partitioning option PART_N×N is not available, but the others. The association between the names for the partitioning modes used in FIG. 10 to the partitioning options shown in FIG. 6 is indicated in FIG. 6 by respective subscripts below the individual partitioning options. The function prediction_unit is called for each partition, such as partitions 50 and 60 in the coding order mentioned above. The function prediction_unit starts with checking the merge_flag at 414. If the merge_flag is set, a merge_index inevitably follows at 416. The check at step 414, is for checking as to whether the merge_flag related to the whole coding unit as signalized at 406 has been set or not. If not, a merge_flag is signalized again at 418, and if the latter is set, a merge_index follows at 420, which indicates the merge candidate for the current partition. Again, merge_flag is signaled for the current partition at 418 merely in case of the current prediction mode of the current coding unit is an inter prediction mode (see 422).

As is visible from FIGS. 11A and 11B, the transmission of the prediction parameters in use for the current prediction unit at 424 is, in accordance with the present embodiment, performed merely in case of merging not being used for the present prediction unit.

Although the above description of the embodiment of FIGS. 9, 10, 11A, and 11B already describe most of the functionality and semantics, some further information is presented below.

merge_flag[x0][y0] specifies whether the inter prediction parameters for the current prediction unit (see 50 and 60 in the figures) are inferred from a neighboring inter-predicted partition. The array indices x0, y0 specify the location (x0, y0) of the top-left luma sample of the considered prediction block (see 50 and 60 in the figures) relative to the top-left luma sample of the picture (see 20 in the figures).

merge_idx[x0][y0] specifies the merging candidate index of the merging candidate list where x0, y0 specify the location (x0, y0) of the top-left luma sample of the considered prediction block relative to the top-left luma sample of the picture.

Figure 12:
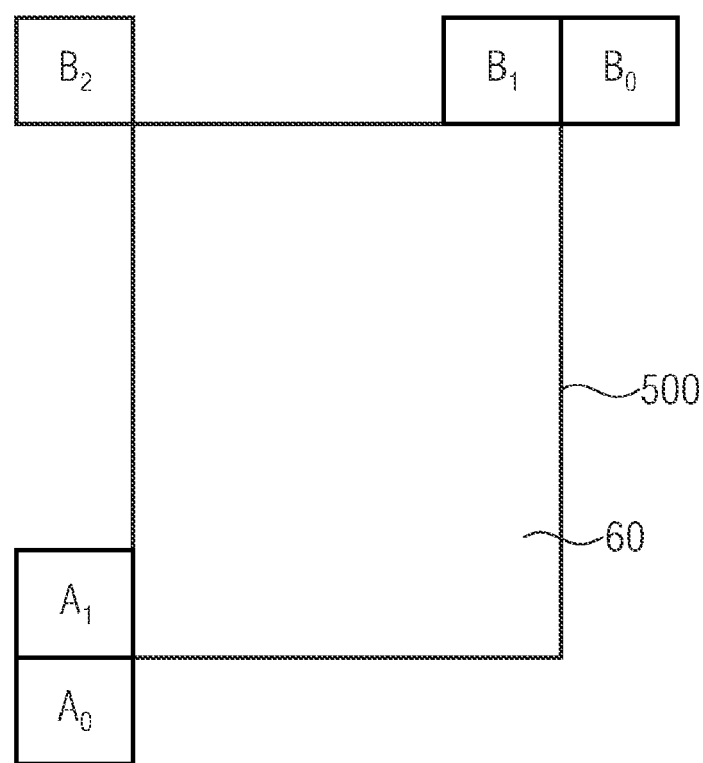
FIG. 12 schematically shows the definition of neighboring partitions for a partition in accordance with an embodiment.

Although not specifically indicated in the above description of FIGS. 9, 10, 11A, and 11B, the merging candidates or the list of merging candidates is determined in this embodiment exemplarily using not only coding parameters or prediction parameters of spatially neighboring prediction unit/partitions, but rather, a list of candidates is also formed by using prediction parameters of temporally neighboring partitions of temporally neighboring and previously coded pictures. Moreover, combinations of prediction parameters of spatially and/or temporally neighboring prediction units/partitions are used and included into the list of merging candidates. Naturally, merely a subset thereof may be used. In particular, FIG. 12 shows one possibility of determining spatial neighbors, i.e. spatially neighboring partitions or prediction units. FIG. 12 shows exemplarily a prediction unit or partition 60 and pixels $B_0$ to $B_2$ and $A_0$ and $A_1$ which are located directly adjacent the border 500 of partition 60, namely $B_2$ being diagonally adjacent the top left pixel of partition 60, B1 being located vertically above and adjacent the top right-hand pixel of partition 60, B0 being located diagonally to the top right-hand pixel of partition 60, A1 being located horizontally to the left of, and adjacent the bottom left-hand pixel of partition 60, and A0 being located diagonally to the bottom left-hand pixel of partition 60. A partition that includes at least one of pixels $B_0$ to $B_2$ and $A_0$ and $A_1$ forms a spatial neighbor and the prediction parameters thereof form a merge candidate.

In order to perform the above-mentioned removal of those candidates which would lead to another partitioning mode which would also have been available, the following functions could be used:

In particular, the candidate N, i.e. the coding/prediction parameters stemming from the prediction unit/partition covering pixel N=($B_0$, $B_1$, $B_2$, $A_0$, $A_1$), i.e. position (xN, yN), is removed from the candidate list if any of the following conditions is true (please see FIG. 6 for the partitioning mode PartMode and the corresponding partitioning index PartIdx indexing the respective partition inside the coding unit):

PartMode of the current prediction unit is PART_2N×N and PartIdx is equal to 1 and the prediction units covering luma location (xP, yP−1) (PartIdx=0) and luma location (xN, yN) (Cand. N) have identical motion parameters:

mvLX[xP,yP−1]==mvLX[xN,yN]

refIdxLX[xP,yP−1]==refIdxLX[xN,yN]

predFlagLX[xP,yP−1]==predFlagLX[xN,yN]

PartMode of the current prediction unit is PART_N×2N and PartIdx is equal to 1 and the prediction units covering luma location (xP−1, yP) (PartIdx=0) and luma location (xN, yN) (Cand. N) have identical motion parameters:

mvLX[xP−1,yP]==mvLX[xN,yN]

refIdxLX[xP−1,yP]==refIdxLX[xN,yN]

predFlagLX[xP−1,yP]==predFlagLX[xN,yN]

PartMode of the current prediction unit is PART_N×N and PartIdx is equal to 3 and the prediction units covering luma location (xP−1, yP) (PartIdx=2) and luma location (xP−1, yP−1) (PartIdx=0) have identical motion parameters:

mvLX[xP−1,yP]==mvLX[xP−1,yP−1]

refIdxLX[xP−1,yP]==refIdxLX[xP−1,yP−1]

predFlagLX[xP−1,yP]==predFlagLX[xP−1,yP−1]

and the prediction units covering luma location (xP, yP−1) (PartIdx=1) and luma location (xN, yN) (Cand. N) have identical motion parameters:

mvLX[xP,yP−1]==mvLX[xN,yN]

refIdxLX[xP,yP−1]==refIdxLX[xN,yN]

predFlagLX[xP,yP−1]==predFlagLX[xN,yN]

PartMode of the current prediction unit is PART_N×N and PartIdx is equal to 3 and the prediction units covering luma location (xP, yP−1) (PartIdx=1) and luma location (xP−1, yP−1) (PartIdx=0) have identical motion parameters:

mvLX[xP,yP−1]==mvLX[xP−1,yP−1]

refIdxLX[xP,yP−1]==refIdxLX[xP−1,yP−1]

predFlagLX[xP,yP−1]==predFlagLX[xP−1,yP−1]

and the prediction units covering luma location (xP−1, yP) (PartIdx=2) and luma location (xN, yN) (Cand. N) have identical motion parameters:

mvLX[xP−1,yP]==mvLX[xN,yN]

refIdxLX[xP−1,yP]==refIdxLX[xN,yN]

In this regard, please note that position or location (xP, yP) denotes the uppermost pixel of the current partition/prediction unit. That is, in accordance with the first item, all coding parameter candidates are checked which have been derived by directly adopting the respective coding parameters of neighboring prediction units, namely prediction unit N. The other additional coding parameter candidates may, however, be checked in the same manner as to whether same are equal to the coding parameters of the respective prediction unit emerging with which would result in obtaining another partitioning pattern also supported by the syntax. In accordance with the embodiments just described, the equality of the coding parameters encompasses a check of the equality of the motion vector, i.e. mvLX, the reference index, i.e. reflxLX, and the prediction flag predFlagLX indicating that the parameters, i.e. motion vector and reference index, associated with reference list X, with X being 0 or 1, are used in inter prediction.

Please note that the just-described possibility for removal of coding parameter candidates of neighboring prediction units/partitions would also be applicable in case of supporting asymmetric partitioning modes shown in the right-hand half of FIG. 6. In that case, the mode PART_2N×N could represent all horizontally subdividing modes and PART_N×2N could correspond to all vertically subdividing modes. Further, the mode PART_N×N could be excluded from the supported partitioning modes or partitioning patterns and in that case, merely the first two removal checks would have to be performed.

Regarding the embodiment FIGS. 9-12, it should also be noted that it is possible to exclude the intra predicted partitions from the list of candidates, i.e. their coding parameters are, naturally, not included into the list of candidates.

Further, it is noted that three contexts could be used for the merge_flag and the merge_index.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed:

1. A decoder configured to decode a bitstream signaling one of supported partitioning patterns for a current block of a picture, the decoder being configured to:
    if the signaled one of the supported partitioning patterns specifies a subdivision of the current block into two sub-blocks,
    remove, for a sub-block except a first sub-block of the sub-blocks in a coding order, from a set of coding parameter candidates for the respective sub-block, a coding parameter candidate associated with a candidate block, wherein the candidate block, when merged with the respective sub-block, results in one of the supported partitioning patterns,
    wherein the decoder is configured to:
    determine coding parameter candidates for a current sub-block of the sub-blocks,
    check whether a total number of determined coding parameter candidates is equal to a predetermined number of coding parameter candidates needed to complete the set of coding parameter candidates for the current sub-block, and
    based on an indication from the check that the total number of determined coding parameter candidates is less than the predetermined number of coding parameter candidates, provide one or more ancillary coding parameter candidates to the set of coding parameter candidates to complete the set.

2. The decoder according to claim 1, wherein the one or more ancillary coding parameter candidates include parameters of neighboring partitions of temporally neighboring and previously coded pictures.

3. The decoder according to claim 1, wherein the one or more ancillary coding parameter candidates include a zero motion vector parameter or a combined coding parameter candidate obtained by combination of coding parameters associated with previously decoded blocks neighboring the current sub-block.

4. The decoder according to claim 1, wherein the decoder is configured to, depending on the total number of coding parameter candidates in the set of coding parameter candidates being greater than one, decode a syntax element from the bitstream specifying which of the predetermined number of coding parameter candidates is to be used for merging.

5. The decoder according to claim 1, wherein the decoder is configured to, if the signaled one of the supported partitioning patterns specifies a subdivision of the block into two sub-blocks, remove for a second sub-block of the sub-blocks in the coding order, from the set of coding parameter candidates for the second sub-block, coding parameter candidates having coding parameters which are the same as coding parameters associated with the first sub-block of the sub-blocks in the coding order.

6. The decoder according to claim 1, wherein the picture has associated therewith a depth map as additional information.

7. The decoder according to claim 1, wherein the picture includes samples arrays related to different planes of the picture, which are coded independently from each other.

8. An encoder configured to encode a picture into a bitstream, the encoder being configured to:
    signaling, within a bitstream, one of supported partitioning patterns for a current block; and if the signaled one of the supported partitioning patterns specifies a subdivision of the current block into two sub-blocks, remove, for a sub-block except a first sub-block of the sub-blocks in a coding order, from a set of coding parameter candidates for the respective sub-block, a coding parameter candidate associated with a candidate block, wherein the candidate block, when merged with the respective sub-block, results in one of the supported partitioning patterns, wherein the encoder is configured to:

determine coding parameter candidates for a current sub-block of the sub-blocks, check whether a total number of determined coding parameter candidates is equal to a predetermined number of coding parameter candidates needed to complete the set of coding parameter candidates for the current sub-block, and based on an indication from the check that the total number of determined coding parameter candidates is less than the predetermined number of coding parameter candidates, provide one or more ancillary coding parameter candidates to the set of coding parameter candidates to complete the set.

9. The encoder according to claim 8, wherein the one or more ancillary coding parameter candidates include parameters of neighboring partitions of temporally neighboring and previously coded pictures.

10. The encoder according to claim 8, wherein the one or more ancillary coding parameter candidates include a zero motion vector parameter or a combined coding parameter candidate obtained by combination of coding parameters associated with previously decoded blocks neighboring the current sub-block.

11. The encoder according to claim 8, wherein the encoder is configured to, if the signaled one of the supported partitioning patterns specifies a subdivision of the block into two sub-blocks, remove for a second sub-block of the sub-blocks in the coding order, from the set of coding parameter candidates for the second sub-block, coding parameter candidates having coding parameters which are the same as coding parameters associated with the first sub-block of the sub-blocks in the coding order.

12. The encoder according to claim 8, wherein the picture has associated therewith a depth map as additional information.

13. The encoder according to claim 8, wherein the picture includes samples arrays related to different planes of the picture, which are coded independently from each other.

14. The encoder according to claim 8, wherein the encoder is configured to derive at least one coding parameter candidate of the set based on a combination of coding parameters of two previously coded blocks.

15. The decoder according to claim 1, wherein the decoder is configured to derive at least one coding parameter candidate of the set based on a combination of coding parameters of two previously decoded blocks.

16. A non-transitory computer-readable medium for storing video data, comprising:

a data stream stored in the non-transitory computer-readable medium and comprising data signaling one of supported partitioning patterns for a current block of a picture, and wherein the data stream is decoded by executing operations using a processor, the operations including:

if the signaled one of the supported partitioning patterns specifies a subdivision of the current block into two sub-blocks, removing, for a sub-block except a first sub-block of the sub-blocks in a coding order, from a set of coding parameter candidates for the respective sub-block, a coding parameter candidate associated with a candidate block, wherein the candidate block, when merged with the respective sub-block, results in one of the supported partitioning patterns;

determining coding parameter candidates for a current sub-block of the sub-blocks;

checking whether a total number of determined coding parameter candidates is equal to a predetermined number of coding parameter candidates needed to complete the set of coding parameter candidates for the current sub-block; and based on an indication from the check that the total number of determined coding parameter candidates is less than the predetermined number of coding parameter candidates, providing one or more ancillary coding parameter candidates to the set of coding parameter candidates to complete the set.

17. The non-transitory computer-readable medium according to claim 16, wherein the one or more ancillary coding parameter candidates include parameters of neighboring partitions of temporally neighboring and previously coded pictures.

18. The non-transitory computer-readable medium according to claim 16, wherein the one or more ancillary coding parameter candidates include a zero motion vector parameter or a combined coding parameter candidate obtained by combination of coding parameters associated with previously decoded blocks neighboring the current sub-block.

19. The non-transitory computer-readable medium according to claim 16, wherein the picture has associated therewith a depth map as additional information.

20. The non-transitory computer-readable medium according to claim 16, wherein the picture includes samples arrays related to different planes of the picture, which are coded independently from each other.

* * * * *